United States Patent
Lee et al.

(10) Patent No.: US 12,151,511 B2
(45) Date of Patent: Nov. 26, 2024

(54) WHEEL HUB AND WHEEL BEARING ASSEMBLY COMPRISING THE SAME

(71) Applicant: ILJIN GLOBAL Co., Ltd, Seoul (KR)

(72) Inventors: In Ha Lee, Seoul (KR); Min Woo Song, Seoul (KR); Seon Ho Lee, Seoul (KR); Hee Chan Shim, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 678 days.

(21) Appl. No.: 17/335,372

(22) Filed: Jun. 1, 2021

(65) Prior Publication Data

US 2021/0283951 A1    Sep. 16, 2021

Related U.S. Application Data

(63) Continuation of application No. PCT/KR2019/016880, filed on Dec. 2, 2019.

(30) Foreign Application Priority Data

Nov. 30, 2018 (KR) .................. 10-2018-0152953

(51) Int. Cl.
*B60B 27/06* (2006.01)
*B60B 27/00* (2006.01)

(52) U.S. Cl.
CPC ........ *B60B 27/065* (2013.01); *B60B 27/0005* (2013.01); *B60B 2900/111* (2013.01); *B60B 2900/311* (2013.01)

(58) Field of Classification Search
CPC . B60B 27/00; B60B 27/0005; B60B 27/0026; B60B 27/0073; B60B 27/065;
(Continued)

(56) References Cited

U.S. PATENT DOCUMENTS 9,011,015 B2 * 4/2015 Ishikawa ............... F16C 19/185
                                                   384/492
2018/0154691 A1   6/2018 Andler et al.

FOREIGN PATENT DOCUMENTS

EP    2863082 A1 *  4/2015  ............ B60B 27/00
EP    3115225 A1 *  1/2017  ............ B60B 27/00
(Continued)

OTHER PUBLICATIONS

International Search Report of PCT/KR2019/016880 dated Mar. 10, 2020.

*Primary Examiner* — S. Joseph Morano
*Assistant Examiner* — Eva L Comino
(74) *Attorney, Agent, or Firm* — Dinsmore & Shohl LLP; Yongsok Choi, Esq.

(57) ABSTRACT

A wheel hub includes an inner hub part made of a first material and comprising a central portion formed to protrude in an axially inward direction and a flange portion formed to extend in a radially outward direction from the central portion; and an outer hub part made of a second material, which is lower in strength and lighter in weight than the first material, and configured to be integrally coupled with the inner hub part. The flange portion comprises a plurality of main extended portions in which a plurality of fastening holes are formed to penetrate in an axial direction while being arranged to be spaced apart from each other along a circumferential direction so that a wheel is mounted to the flange portion. The plurality of main extended portions are formed to extend along a plurality of virtual extension reference lines which extend in the radially outward direction.

19 Claims, 18 Drawing Sheets

(58) Field of Classification Search
CPC ......... B60B 2900/111; B60B 2900/311; B60B 2310/318; B60B 2310/321; B60B 2360/10; B60B 5/02
USPC .......................................................... 301/92
See application file for complete search history.

(56) References Cited

FOREIGN PATENT DOCUMENTS

| | | | | | |
|---|---|---|---|---|---|
| JP | 2009113635 | A | * | 5/2009 | ......... B60B 27/0005 |
| JP | 2017077858 | A | | 4/2017 | |
| KR | 101484812 | B1 | | 1/2015 | |
| KR | 20170004769 | A | * | 1/2017 | ............. B60B 27/06 |
| KR | 1020170004769 | A | | 1/2017 | |

* cited by examiner

WHEEL HUB AND WHEEL BEARING ASSEMBLY COMPRISING THE SAME

CROSS-REFERENCE TO RELATED APPLICATION

This application is a continuation of International Application No. PCT/KR2019/016880 filed on Dec. 2, 2019, which claims priority to Korean Patent Application No 10-2018-0152953 filed on Nov. 30, 2018, the entire contents of which are herein incorporated by reference.

TECHNICAL FIELD

The present disclosure relates to a wheel hub and a wheel bearing assembly comprising the same. The present disclosure has been derived from a study conducted as one of wide-area cooperation industry promotion business projects of Ministry of Trade, Industry and Energy and Korea Institute for Advancement of Technology (KIAT) [Project Number: P0002115, Project Name: Development of automotive lightweight wheel bearing using dissimilar materials].

BACKGROUND ART

A wheel bearing assembly is a device that is mounted between a rotary element and a non-rotary element of a vehicle to facilitate the rotation of the rotary element. The wheel bearing assembly for the vehicle performs a function of rotatably connecting a wheel to a vehicle body so as to move the vehicle. Such a wheel bearing assembly may be classified into a wheel bearing assembly for a driving wheel that transmits power generated by an engine and a wheel bearing assembly for a driven wheel that does not transmit a driving force.

The wheel bearing assembly for the driving wheel comprises a rotary element and a non-rotary element. The rotary element may be rotated with a drive shaft by virtue of torque generated by the engine and passed through a transmission. In contrast, the non-rotary element is fixed to the vehicle body. Rolling elements are interposed between the rotary element and the non-rotary element. The wheel bearing assembly for the driven wheel is similar in configuration to the wheel bearing assembly for the driving wheel, but is different from the wheel bearing assembly for the driving wheel in that the rotary element is not connected to the drive shaft.

SUMMARY

Technical Problem

A conventional wheel bearing assembly occupies a significant weight in a drive system of the vehicle. Thus, in order to increase the drive efficiency, the weight of the wheel bearing assembly needs to be reduced. However, it is difficult to reduce the weight of the wheel bearing assembly while securing a required design strength. Embodiments of the present disclosure are provided to solve such problems.

When a wheel hub to which dissimilar materials are applied is used to reduce the weight of the wheel bearing assembly, there is a need for securing a coupling force between the dissimilar materials. Embodiments of the present disclosure provide a wheel hub having an improved structure to enhance a physical coupling force between the dissimilar materials.

Technical Solution

One aspect of the present disclosure provides embodiments of a wheel hub. The wheel hub according to a representative embodiment comprises: an inner hub part made of a first material and comprising a central portion formed to protrude in an axially inward direction and a flange portion formed to extend in a radially outward direction from the central portion; and an outer hub part made of a second material, which is lower in strength and lighter in weight than the first material, and configured to be integrally coupled with the inner hub part. The flange portion comprises a plurality of main extended portions in which a plurality of fastening holes are formed to penetrate in an axial direction while being arranged to be spaced apart from each other along a circumferential direction so that a wheel is mounted to the flange portion, the plurality of main extended portions being formed to extend along a plurality of virtual extension reference lines which respectively extend in the radially outward direction from a rotational axis toward positions of the plurality of fastening holes. The outer hub part comprises a circumferential portion extending in the circumferential direction to connect the plurality of main extended portions. Each of the plurality of main extended portions has a first circumferential boundary and a second circumferential boundary with reference to the corresponding extension reference line. The first circumferential boundary extends in a direction between a radially inward direction and a first circumferential direction, and the second circumferential boundary extends in a direction between the radially inward direction and a second circumferential direction.

In embodiments, each of the plurality of fastening holes may be formed at a radially outward direction portion of the corresponding main extended portion.

In embodiments, the first circumferential boundary of each of the plurality of main extended portions may extend in a direction closer to a vertical direction against the virtual extension reference line positioned adjacent to the first circumferential direction than an extension direction of the virtual extension reference line positioned adjacent to the second circumferential direction, and the second circumferential boundary of each of the plurality of main extended portions may extend in a direction closer to a vertical direction against the virtual extension reference line positioned adjacent to the second circumferential direction than an extension direction of the virtual extension reference line positioned adjacent to the first circumferential direction.

In embodiments, in each of the plurality of main extended portions, the first circumferential boundary may define a first angle with respect to the virtual extension reference line positioned adjacent to the second circumferential direction, and the second circumferential boundary may define a second angle with respect to the virtual extension reference line positioned adjacent to the first circumferential direction. The first angle and the second angle may be identical to each other.

In embodiments, in each of the plurality of main extended portions, the first circumferential boundary may define a first angle with respect to the virtual extension reference line positioned adjacent to the second circumferential direction, and the second circumferential boundary may define a second angle with respect to the virtual extension reference line positioned adjacent to the first circumferential direction. The first angle may be in a range of 10 to 60 degrees, and the second angle may be in the range of 10 to 60 degrees.

In embodiments, in each of the plurality of main extended portions, a virtual extension line which extends along the first circumferential boundary and a virtual extension line which extends along the second circumferential boundary may intersect with each other outside the outer hub part in the radially outward direction.

In embodiments, the flange portion may comprise a locking portion positioned at a portion where a radially outer end surface and an axially inner end surface are connected and having a surface inclined in a direction between the radially inward direction and the axially inward direction. The outer hub part may cover the locking portion and a radially outer portion of an axially outer surface of the flange portion.

In embodiments, an angle between the axial direction and the inclined surface of the locking portion may be in a range of 1 to 45 degrees.

In embodiments, an axial length of the locking portion may be equal to or greater than a radial length of the locking portion.

In embodiments, an axial length of the locking portion may be equal to or greater than 1/3 of an axial width of the flange portion.

In embodiments, the flange portion may comprise a locking portion which has a first stepped surface spaced apart in the radially inward direction from a radially outer end surface of the flange portion and connected to an axially inner end surface of the flange portion; and a second stepped surface spaced apart in an axially outward direction from the axially inner end surface and connected to the radially outer end surface and the first stepped surface. The outer hub part may cover the first stepped surface, the second stepped surface, and a radially outer portion of an axially outer surface of the flange portion.

In embodiments, the second stepped surface may have a concave curved surface formed to extend roundly in the radially outward direction from an axially outer end of the first stepped surface; and a convex curved surface formed to extend roundly in the radially inward direction from an axially inner end of the radially outer end surface.

In embodiments, the second stepped surface may further have a flat surface formed to extend from the concave curved surface to the convex curved surface so as to connect the concave curved surface and the convex curved surface.

In embodiments, the first stepped surface may have a surface formed to be inclined in a direction between the radially inward direction and the axially inward direction.

In embodiments, the outer hub part may cover axially outer surfaces of the plurality of main extended portions and may comprise a plurality of corresponding holes formed to penetrate the plurality of main extended portions in the axial direction at positions corresponding to the plurality of fastening holes so as to be connected to the plurality of fastening holes, respectively. A diameter of each of the plurality of corresponding holes may be the smallest at an axially inner end portion of the corresponding hole, and a diameter at the axially inner end portion of the corresponding hole is equal to or greater than a diameter of an axially outer end portion of the fastening hole.

In embodiments, the outer hub part may comprise a chamfer portion configured such that a diameter of the corresponding hole gradually increases toward an axially outward direction.

In embodiments, the inner hub part may comprise a plurality of stiffness reinforcement portions formed to protrude in an axially outward direction and extend in a radial direction. The outer hub part may cover an axially outer surface of the inner hub part. The plurality of stiffness reinforcement portions may comprise a plurality of first stiffness reinforcement portions extending in the radially inward direction from the positions of the plurality of fastening holes. The number of the plurality of stiffness reinforcement portions may be equal to the number of the plurality of main extended portions, or equal to a multiple of the number of the plurality of main extended portions.

In embodiments, a circumferential end of a surface of each of the plurality of stiffness reinforcement portions may be connected roundly to a surface of another portion of the inner hub part.

In embodiments, a circumferential central portion of the surface of each of the plurality of the stiffness reinforcement portions may be flat in a direction perpendicular to the axially outward direction, or may protrude roundly in the axially outward direction.

In embodiments, the plurality of stiffness reinforcement portions may comprise a plurality of second stiffness reinforcement portions provided between the plurality of first stiffness reinforcement portions.

In embodiments, the plurality of stiffness reinforcement portions may be formed in a shape in which a circumferential width thereof decreases toward the axially inward direction.

Another aspect of the present disclosure provides embodiments of a wheel bearing assembly. The wheel bearing assembly according to a representative embodiment may comprise: an outer ring; the aforementioned wheel hub configured to be rotatable relative to the outer ring and configured to rotate together with a wheel; and rolling members provided between the outer ring and the wheel hub.

Advantageous Effects

According to embodiments of the present disclosure, by replacing portions other than stress concentration portions with a light-weight material, it is possible to reduce the weight of a wheel hub and a wheel bearing assembly while securing a required design strength.

According to embodiments of the present disclosure, it is possible to enhance a coupling force between an inner hub part and an outer hub part.

According to embodiments of the present disclosure, it is possible to improve efficiency of a process of coupling the inner hub part and the outer hub part.

According to embodiments of the present disclosure, it is possible to increase stiffness for transmission of a rotational force between the inner hub part and the outer hub part.

According to embodiments of the present disclosure, it is possible to reduce the risk of damaging fastening holes by wheel bolts.

EXPLANATION OF REFERENCE NUMERALS

Figure 1:
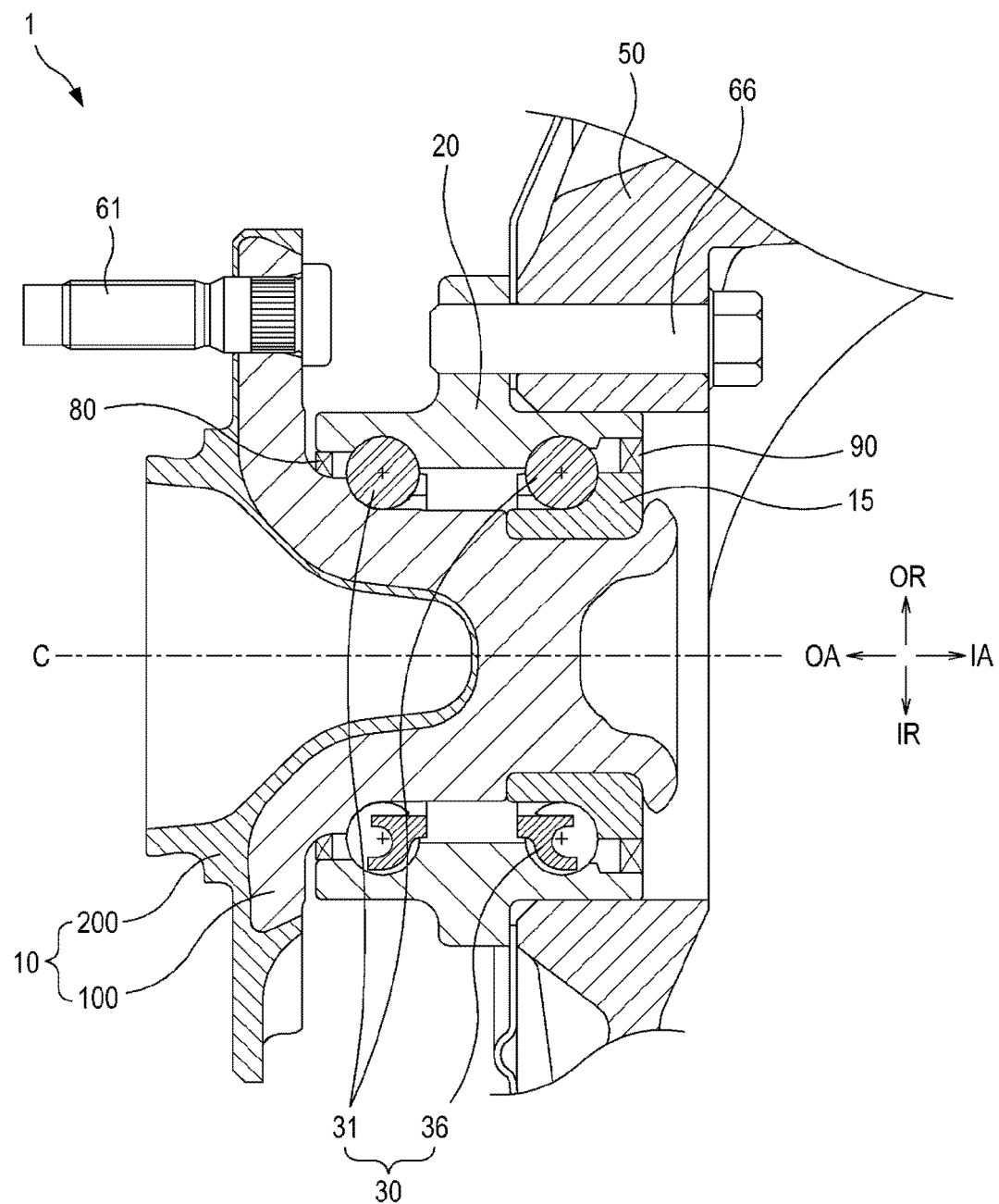
FIG. 1 is a cross-sectional view of a wheel bearing assembly 1 according to an embodiment of the present disclosure.

1: wheel bearing assembly, 10: wheel hub, 15: inner ring, 20: outer ring, 30: rolling member, 80, 90: sealing members, 100', 100": inner hub part, 110: central portion, 120: flange portion, 120h: fastening hole, 121: main extended portion, 126, 126', 126": locking portion, 127: circumferential boundary of main extended portion, 150, 150', 150S1, 150S2: stiffness reinforcement portion, 200, 200', 200": outer hub part, 210: central corresponding portion, 230: circumferential portion, 230h: corresponding hole, 233: chamfer portion, Ls: extension reference line.

DETAILED DESCRIPTION OF DRAWINGS

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," and the like used herein should be construed as open-ended terms encompassing the possibility of including other embodiments.

The singular form described herein may include the plural form unless the context clearly dictates otherwise, and this is equally applied to the singular form set forth in the claims.

Terms a "first," a "second," and the like are used to distinguish a plurality of components, and the order or importance of corresponding components is not limited by these terms.

Dimensions and numerical values described in the present disclosure are not limited only to the dimensions and numerical values described herein. Unless otherwise specified, these dimensions and numerical values may be understood to mean the values described herein and the equivalent ranges including the described values. For example, a dimension of "45 degrees" described herein may be understood to include "about 45 degrees."

A directional directive of a "radial direction" used herein means a direction oriented radially with respect to a rotational axis of a rotating body, a directional directive of a "radially outward direction" used herein means a direction away from the rotational axis in the radial direction with respect to the rotational axis of the rotating body, and a directional directive of a "radially inward direction" means a direction opposite the radially outward direction. Further, a directional directive of an "axial direction" used herein means a direction parallel to the rotational axis of the rotating body, a directional directive of an "axially outward direction" used herein means a direction oriented outward of a vehicle body along the rotational axis of the rotating body, and a directional directive of an "axially inward direction" means a direction oriented inward of the vehicle body along the rotational axis of the rotating body. In addition, a directional directive of a "circumferential direction" used herein means a direction rotating about the rotational axis of the rotating body, a directional directive of a "first circumferential direction" used herein means one of the clockwise direction and the counterclockwise direction as the circumferential direction, and a directional directive of a "second circumferential direction" used herein means a direction opposite the first circumferential direction. Throughout the drawings, there are illustrated a rotational axis C of the rotating body, a radially outward direction OR, a radially inward direction IR, an axially outward direction OA, an axially inward direction IA, a first circumferential direction C1 and a second circumferential direction C2.

Hereinafter, embodiments of the present disclosure will be described with reference to the accompanying drawings. In the accompanying drawings, the same reference numerals are assigned to the same or corresponding components. Further, in the following descriptions of the embodiments, duplicate descriptions of the same or corresponding components may be omitted. However, even though descriptions on any component is omitted, such a component is not intended to be excluded in any embodiment.

FIG. 1 is a cross-sectional view of a wheel bearing assembly 1 according to an embodiment of the present disclosure. Referring to FIG. 1, the wheel bearing assembly 1 comprises an outer ring 20 fixed to a vehicle body and an inner ring part 10 and 15 provided rotatably relative to the outer ring 20. The outer ring 20 supports the inner ring part 10 and 15 such that the inner ring part 10 and 15 rotates relative to the outer ring 20.

The outer ring 20 is coupled to a knuckle 50. The outer ring 20 comprises a flange protruding in the radially outward direction OR. The outer ring 20 and the knuckle 50 may be coupled to each other by knuckle bolts 66 that pass through the flange of the outer ring 20 in the axial direction OA or IA.

The inner ring part 10 and 15 is configured to rotate together with the wheel. The inner ring part 10 and 15 comprises a wheel hub 10 and an inner ring 15. However, in other embodiments not shown, the inner ring part may be configured to comprise only the wheel hub 10. Hereinafter, the inner ring part 10 and 15 of the present embodiment will be described. The inner ring 15 is press-fitted onto an outer circumferential surface of the wheel hub 10. The inner ring 15 rotates together with the wheel hub 10.

The wheel hub 10 is configured to be rotatable relative to the outer ring 20. The wheel hub 10 is configured to rotate together with the wheel. The wheel is coupled to the wheel hub 10 such that the wheel hub 10 rotates together with the wheel. The wheel hub 10 has a flange protruding in the radially outward direction OR. The wheel hub 10 and the wheel may be coupled to each other by wheel bolts 61 that pass through the flange of the wheel hub 10 in the axial direction OA or IA.

The wheel hub 10 comprises an inner hub part 100 disposed in the axially inward direction IA, and an outer hub part 200 coupled to the inner hub part 100 from the axially outward direction OA. The inner hub part 100 rotates together with the outer hub part 200.

The expression "a first component rotates together with a second component" used herein means that the first component rotates in the same direction and the same rotation speed as the second component.

The wheel bearing assembly 1 comprises rolling members 30 disposed between the outer ring 20 and the inner ring part 10 and 15. The rolling members 30 are disposed between an outer circumferential surface of the inner ring part 10 and 15 and an inner circumferential surface of the outer ring 20. The rolling members 30 are disposed between the outer ring 20 and the wheel hub 10.

The rolling member 30 may comprise a plurality of rolling elements 31 disposed between the outer circumferential surface of the wheel hub 10 and the inner circumferential surface of the outer ring 20 facing the outer circumferential surface of the wheel hub 10. In addition, the rolling member 30 may comprise a plurality of rolling elements 31 disposed between an outer circumferential surface of the inner ring 15 and an inner circumferential surface of the outer ring 20 facing the outer circumferential surface of the inner ring 15.

In the present embodiment, the plurality of rolling elements 31 are arranged in two rows at predetermined intervals in the axial direction OA or IA, but the number of rows of the plurality of rolling elements 31 in the axial direction OA or IA is not limited thereto. The plurality of rolling elements 31 may be arranged in one row, or three or more rows. Further, in the present embodiment, the plurality of rolling elements 31 are shown as ball bearings, but the rolling elements 31 may be roller bearings, tapered roller bearings, needle bearings, and the like. In addition, in the present embodiment, the plurality of rolling elements 31 are formed of a metallic material, but the rolling elements 31 may be formed of various materials such as plastic.

The plurality of rolling elements 31 provided in each row are arranged about a rotational axis C in the circumferential direction. The rolling member 30 may comprise a retainer 36 that holds the plurality of rolling elements 31 at regular intervals along the circumferential direction. The retainer 36 restricts the position of the plurality of rolling elements 31. The retainer 36 is positioned between the outer ring 20 and the inner ring part 10 and 15.

Figure 2:
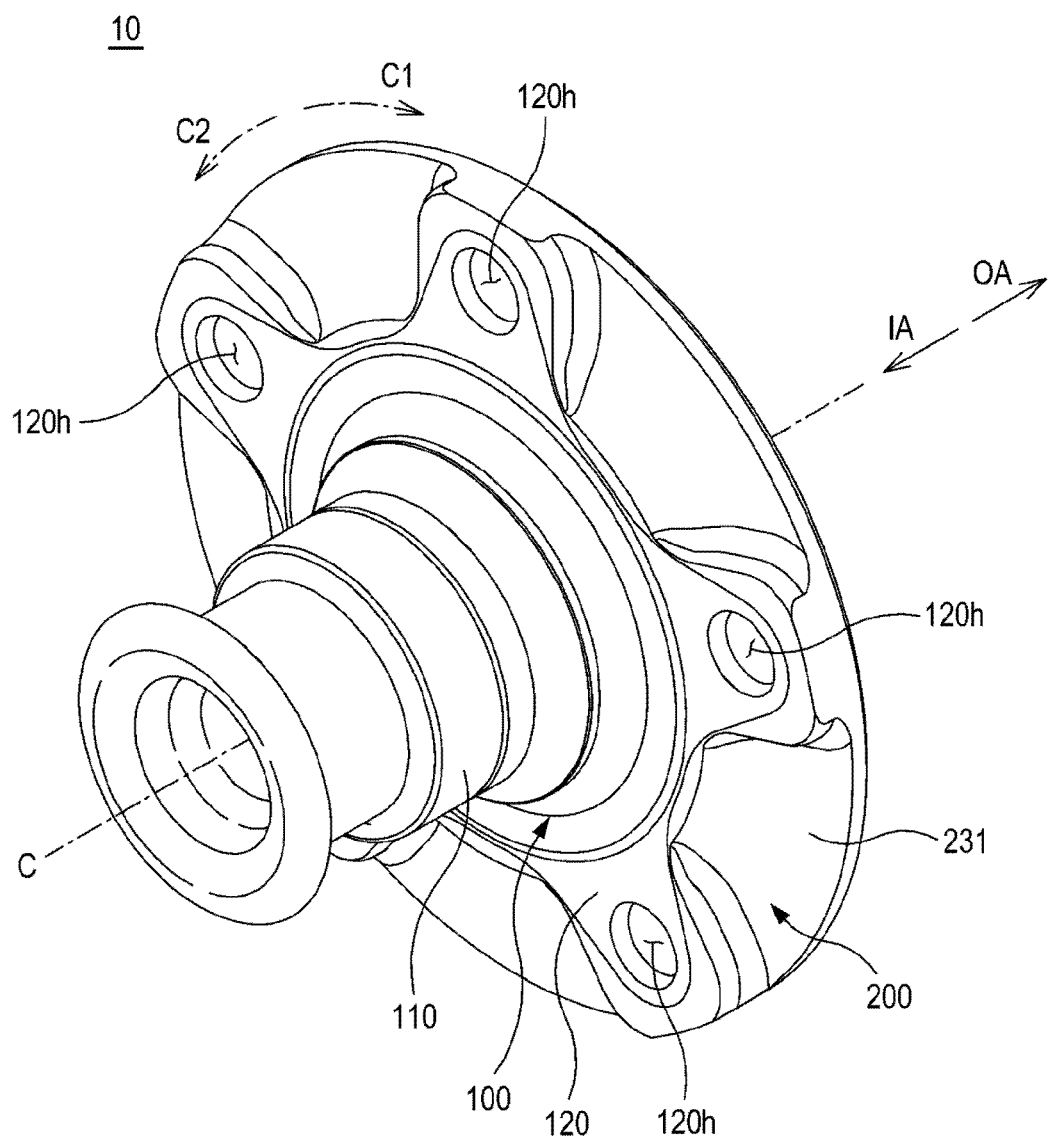
FIG. 2 is a perspective view of a wheel hub 10 in the embodiment illustrated in FIG. 1.
Figure 3:
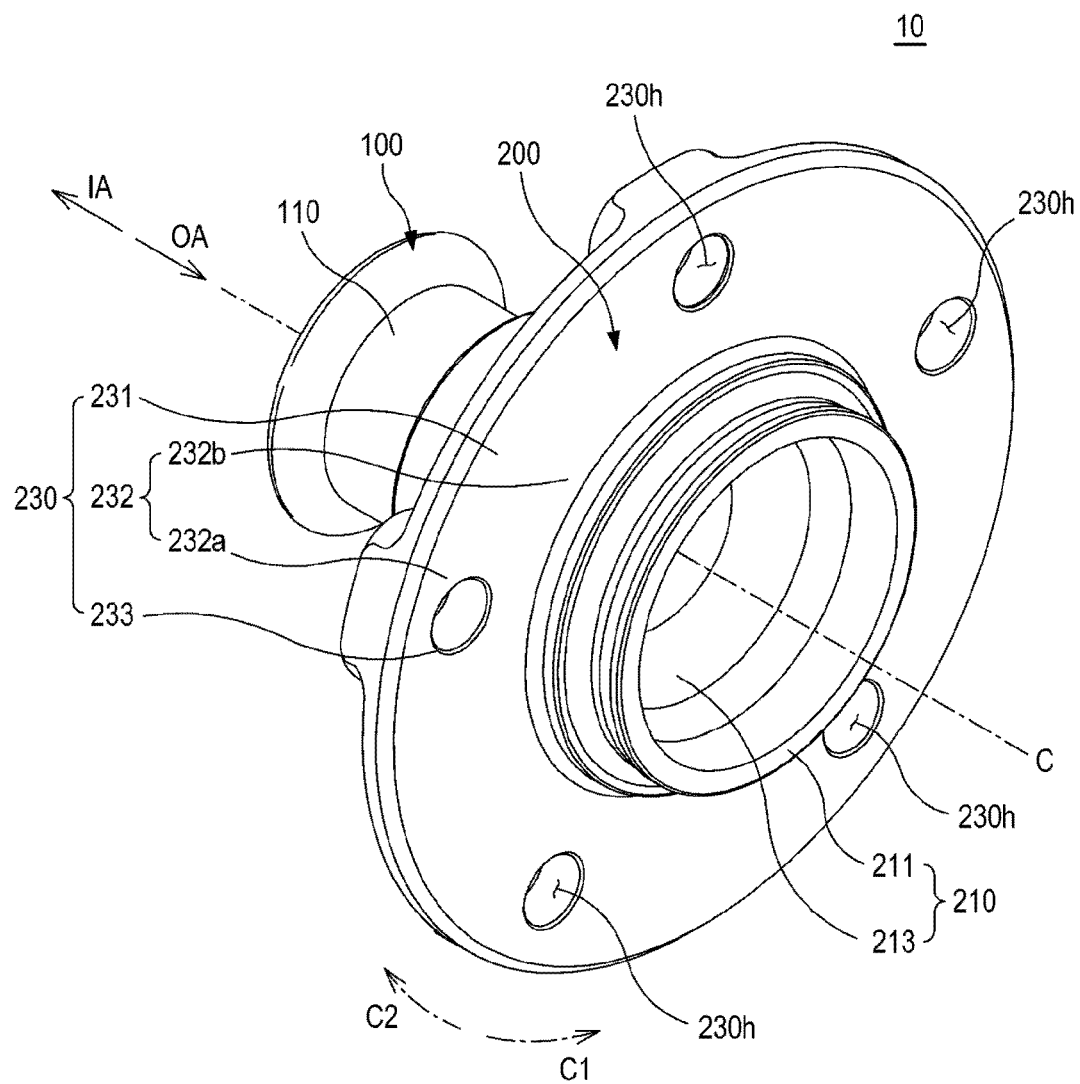
FIG. 3 is a perspective view of the wheel hub 10 of FIG. 2 when viewed in another direction.

FIG. 2 is a perspective view of the wheel hub 10 in the embodiment illustrated in FIG. 1. FIG. 3 is a perspective view of the wheel hub 10 of FIG. 2 when viewed in another direction. Referring to FIGS. 2 and 3, holes 120h and 230h which penetrate the inner hub part 100 and the outer hub part 200 may be formed in the wheel hub 10. Fastening holes 120h of the inner hub part 100 and corresponding holes 230h of the outer hub part 200 are connected to each other to form the holes 120h and 230h of the wheel hub 10. The wheel bolts 61 pass through the holes 120h and 230h and are fixed to the wheel hub 10.

The inner hub part 100 is disposed inward of the outer hub part 200 in the axially inward direction IA. The outer hub part 200 covers an axially outer surface of the inner hub part. The outer hub part 200 is disposed toward the wheel on the inner hub part 100.

The wheel hub 10 may be composed of at least two different kinds of materials. The inner hub part 100 and the outer hub part 200 may be made of different materials.

The inner hub part 100 is made of a first material. For example, the first material may be a steel material.

The inner hub part 100 has a central portion 110 protruding in the axially inward direction IA. The central portion 110 protrudes from the center portion of a flange portion 120. An outer circumferential surface of the central portion 110 faces the inner circumferential surface of the outer ring 20. The rolling members 30 are positioned between the central portion 110 and the outer ring 20. A surface of the central portion 110 toward the axially outward direction OA defines a groove concave in the axially inward direction IA. An inner circumferential surface of the central portion 110 is covered by the outer hub part 200. The central portion 110 is covered by a central cover portion 213 of the outer hub part 200.

The inner hub part 100 comprises the flange portion 120 extending in the radially outward direction OR from the central portion 110. The flange portion 120 is radially formed around the rotational axis C. The flange portion 120 may be formed in a plate shape having a thickness in the axial direction OA or IA. An axially outer surface of the flange portion 120 is covered by the outer hub part 200. The axially outer surface of the flange portion 120 is covered by an outer cover portion 232 of the outer hub part 200.

The flange portion 120 has the plurality of fastening holes 120h formed to penetrate the flange portion 120 in the axial direction OA or IA such that the wheel is mounted to the flange portion 120. The plurality of fastening holes 120h are formed to be spaced apart from each other along the circumferential direction C1 or C2. The plurality of fastening holes 120h may be formed to be spaced apart from each other by predetermined distances in the circumferential direction C1 or C2.

The flange portion 120 comprises a plurality of main extended portions 121 extending in the radially outward direction OR from the rotational axis C toward respective positions of the plurality of fastening holes 120h. The main extended portions 121 are formed to protrude in the radially outward direction OR.

The flange portion 120 comprise auxiliary extended portions 122 positioned between two main extended portions 121 adjacent to each other in the circumferential direction C1 or C2. The plurality of auxiliary extended portions 122 and the plurality of main extended portions 121 are alternately arranged one by one in the circumferential direction. The auxiliary extended portion 122 protrudes shorter than the main extended portion 121 in the radially outward direction OR. The main extended portion 121 and the auxiliary extended portion 122 are connected to each other such that they are integrated with each other.

The plurality of fastening holes 120h are formed to correspond to the plurality of main extended portions 121 of the flange portion 120. The plurality of fastening holes 120h and the plurality of main extended portions 121 may be the same in number. That is, the plurality of fastening holes 120h may correspond to the plurality of main extended portions 121 in a one-to-one basis.

Each of the fastening holes 120h is formed at a portion which is placed relatively in the radially outward direction OR in the corresponding main extended portion 121. The fastening hole 120h is formed at a position closer to a radially outer end of the corresponding main extended portion 121 than a radially inner end of the corresponding main extended portion 121.

The outer hub part 200 is made of a second material different from the first material. The second material may have a relatively low strength and a relatively light weight compared to the first material.

As an example, the second material may be a lightweight alloy. The lightweight alloy material may be an alloy including at least one of aluminum, magnesium, titanium, or a combination thereof.

When the second material is a lightweight alloy material, the inner hub part 100 and the outer hub part 200 may be integrally formed with each other by cold forging, warm forging, or hot forging. For example, in the case of using the hot forging process, the wheel hub 10 can be manufactured by forming the inner hub part 100 with the first material, disposing the inner hub part 100 and a preform (forged object temporarily manufactured to form the outer hub part 200) of the second material in a mold having an inner shape corresponding to an outer shape of the outer hub part 200, and then hot-forging the inner hub part 100 and the preform in a high-temperature and high-pressure environment.

In another embodiment, the inner hub part 100 and the outer hub part 200 may be formed by semi-solid forging process. The semi-solid forging process may refer to a technique which heats a forged object in a semi-solid state and then compresses the forged object in the semi-solid state, instead of compressing the forged object in a complete liquid state or complete solid state. Here, the semi-solid state of the material may mean that as the forged object is heated to a temperature equal to or greater than a predetermined level, a portion of the forged object may be in a melted state, that is a state between liquid and solid. By such a semi-solid forging process, the inner hub part 100 and the outer hub part 200 may be heated to the temperature equal to or greater than the predetermined level and compressed in the semi-solid state so that they may be integrated with each other. The forging technique may be beneficial over other techniques in terms of a simple process and low cost.

As another example, the second material may have Carbon Fiber Reinforced Plastic (CFRP). For example, in a state in which the manufactured inner hub part 100 and a hot press mold are coupled to each other, a carbon chip including CFRP may be put into the hot press mold to form the outer hub part 200 integrated with the inner hub part 100 by a hot press forming.

As still another example, an adhesive means, such as an adhesive or a brazing filler material, may be applied between the inner hub part 100 and the outer hub part 200 such that the inner hub part 100 and the outer hub part 200 are coupled to each other. The adhesive means may be additionally used together with other coupling methods described above.

In the aforementioned manner, the outer hub part 200 is integrally coupled with the inner hub part 100. After the inner hub part 100 and the outer hub part 200 are integrally formed with each other, the holes 120h and 230h into which the wheel bolts 61 are inserted may be formed at one time by a hole forming apparatus (not shown) such as a drill. In other words, the fastening holes 230h of the inner hub part 100 and the corresponding holes 230h of the outer hub part 200 are not separately formed, but may be formed at the same time through a single process. With this configuration, the fastening holes 120h of the inner hub part 100 and the corresponding holes 230h of the outer hub part 200 can be accurately matched to each other.

The outer hub part 200 comprises a central corresponding portion 210 disposed at the center portion of the outer hub part 200. The central corresponding portion 210 is formed at a position corresponding to the central portion 110 of the inner hub part 100. The central corresponding portion 210 covers the inner circumferential surface of the central portion 110 of the inner hub part 100.

The outer hub part 200 comprises a circumferential portion 230 that extends to connect the plurality of main extended portions 121 in the circumferential direction C1 or C2. The circumferential portion 230 may be formed in a circular shape centered at the rotational axis C when viewed in the axial direction OA or IA. The circumferential portion 230 protrudes in the radially outward direction OR from the central corresponding portion 210 and extends in the circumferential direction C1 or C2. The circumferential portion 230 covers an axial outer surface of the flange portion 120 of the inner hub part 100.

The circumferential portion 230 has the corresponding holes 230h that penetrate the circumferential portion 230 in the axial direction OA or IA. Through the corresponding holes 230h, the circumferential portion 230 is fastened to the wheel. The plurality of corresponding holes 230h are spaced apart from each other along the circumferential direction C1 or C2. The plurality of corresponding holes 230h may be arranged to be spaced apart from each other at regular intervals in the circumferential direction C1 or C2.

The plurality of corresponding holes 230h are formed to be matched to the plurality of fastening holes 120h. The plurality of corresponding holes 230h and the plurality of fastening holes 120h may be the same in number. That is, the plurality of corresponding holes 230h may correspond to the plurality of fastening holes 120h in a one-to-one basis. The plurality of corresponding holes 230h are formed at positions corresponding to the plurality of fastening holes 120h to penetrated in the axial direction OA or IA such that the plurality of corresponding holes 230h are connected to the plurality of fastening holes 120h.

The circumferential portion 230 comprises circumferential extended portions 231 that fill a gap between the two main extended portions 121 adjacent to each other in the circumferential direction C1 or C2. The circumferential extended portion 231 extends in the circumferential direction C1 or C2 to connect the two main extended portions 121 adjacent to each other in the circumferential direction C1 or C2.

Figure 4:
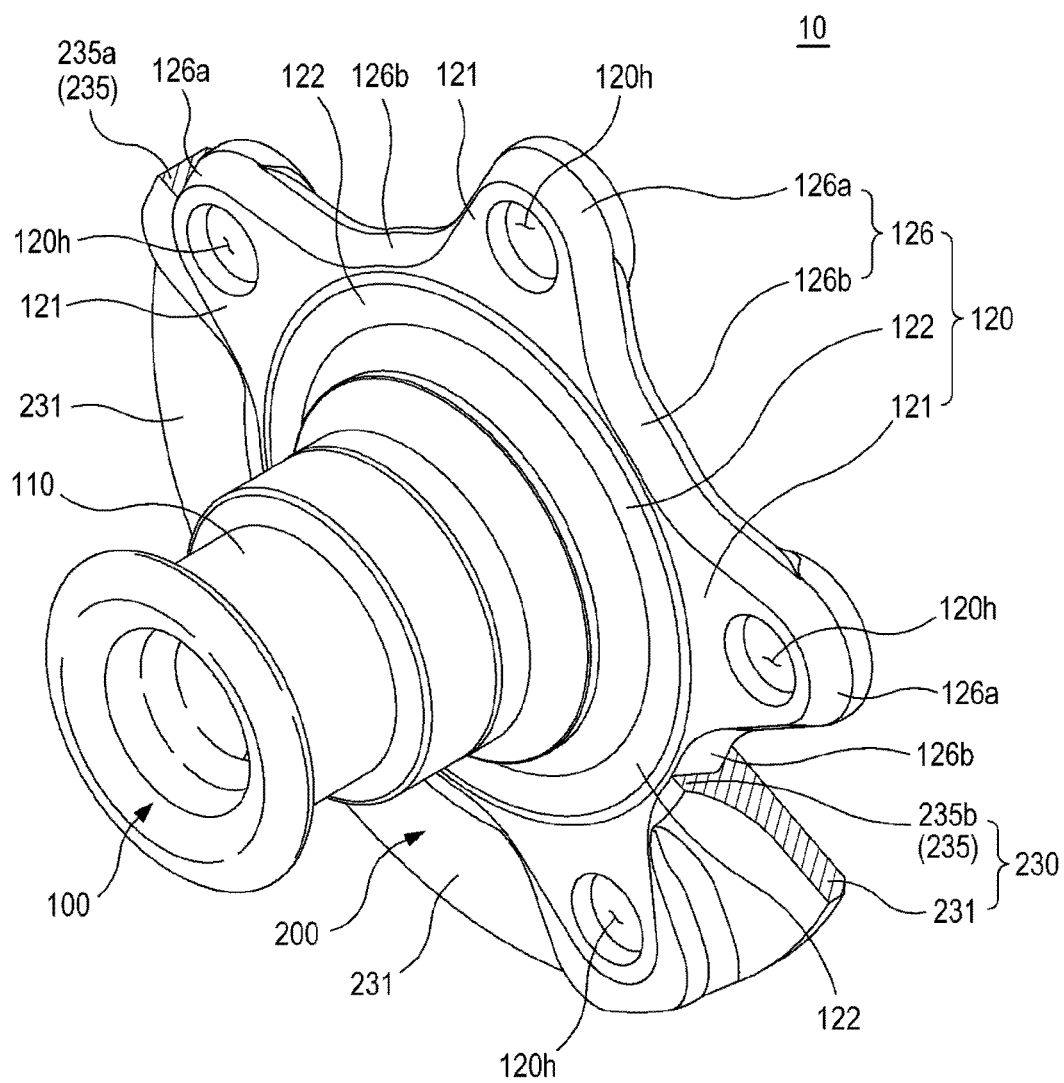
FIG. 4 is a perspective view of the wheel hub 10 of FIG. 2 where an outer hub part 200 is partially cutaway.
Figure 5:
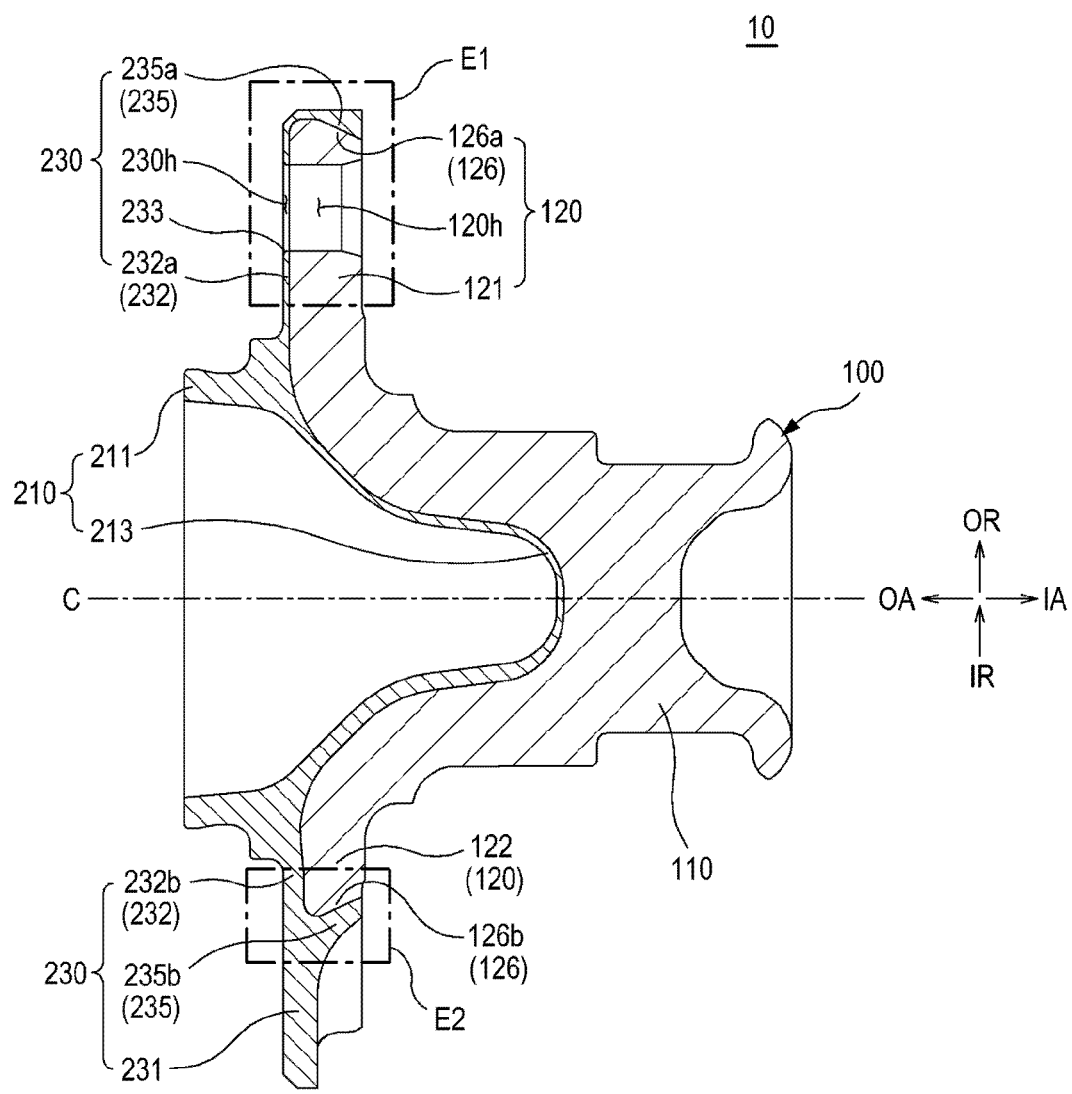
FIG. 5 is a cross-sectional view of the wheel hub 10 in the embodiment illustrated in FIG. 1.

FIG. 4 is a perspective view of the wheel hub 10 of FIG. 2 where an outer hub part 200 is partially cutaway. FIG. 5 is a cross-sectional view of the wheel hub 10 in the embodiment illustrated in FIG. 1. Referring to FIGS. 4 and 5, the inner hub part 100 comprises a locking portion 126 to which the outer hub part 200 is locked. A coupling force between the inner hub part 100 and the outer hub part 200 in the axial direction OA or IA may be further increased by the locking portion 126.

The locking portion 126 is formed at a boundary of the inner hub part 100 in the radially outward direction OR. At the boundary of the flange portion 120 in the radially outward direction OR, an axially inner end portion of the flange portion 120 is more concave in the radially inward direction IR than an axially outer end portion of the flange portion 120. As a result, the locking portion 126 is formed.

The locking portion 126 may extend along a radially outer boundary of the flange portion 120. The locking portion 126 may comprise a first locking portion 126a located at a boundary of the main extended portion 121 in the radially outward direction OR. The locking portion 126 may comprise a second locking portion 126b located at a boundary portion of the auxiliary extended portion 122 in the radially outward direction OR. The first locking portions 126a and the second locking portions 126b are alternately arranged along the circumferential direction C1 or C2.

The outer hub part 200 covers a radially outer surface of the locking portion 126. For example, by the forging process described above, the forged object may flow into a space between the radially outer surface of the locking portion 126 and an inner surface of the mold, and thus a radially outer end portion of the outer hub part 200 may be formed to cover the locking portion 126.

The circumferential portion 230 of the outer hub part 200 comprises a locking corresponding portion 235 which covers a radially outer portion of the axially outer surface of the flange portion 120. The locking corresponding portion 235 covers a radially outer surface of the flange portion 120. The locking corresponding portion 235 covers the locking portion 126 of the flange portion 120. Specifically, the locking corresponding portion 235 continuously surrounds and covers a radially outer portion of the axially outer surface of the flange portion 120 and the locking portion 126. The locking corresponding portion 235 comprises a first locking corresponding portion 235a that covers the first locking portion 126a and a second locking corresponding portion 235b that covers the second locking portion 126b.

The circumferential portion 230 of the outer hub part 200 comprises an outer cover portion 232 connected to the circumferential extended portion 231. The outer hub part 200 covers the axially outer surface of the flange portion 120. The outer cover portion 232 comprises a first outer cover portion 232a that covers an axially outer surface of the main extended portion 121. The outer cover portion 232 comprises a second outer cover portion 232b that covers an axially outer surface of the auxiliary extended portion 122.

The central corresponding portion 210 of the outer hub part 200 comprises a pilot portion 211 protruding in the axially outward direction OA. The central corresponding portion 210 comprises the central cover portion 213 that covers an axially outer surface of the central portion 110 of the inner hub part 100.

Figure 6:
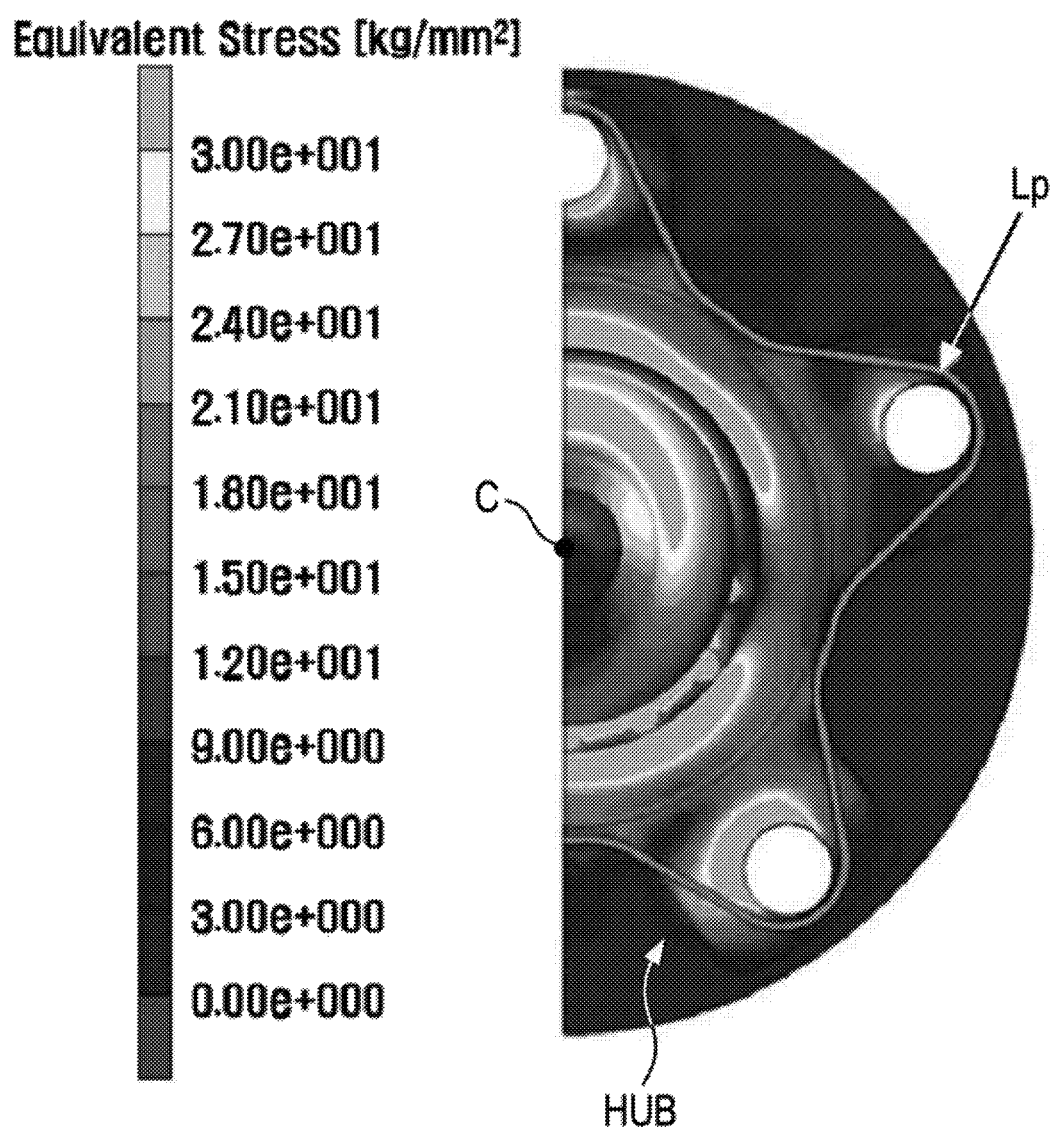
FIG. 6 is a view illustrating experimental results obtained by measuring stress applied to each portion of the wheel hub when the wheel hub integrally formed of a single material is rotated.

FIG. 6 is a view illustrating experimental results obtained by measuring stress applied to each portion of the wheel hub when the wheel hub integrally formed of a single material is rotated. In the experimental example of FIG. 6, a high stress was generally measured at a central portion around the rotational axis C of the wheel hub. In addition, a relatively high stress was measured along a portion extending in the radially outward direction OR from the central portion of the wheel hub to a portion where the wheel bolt is connected. A relatively low stress was measured at a portion between two holes adjacent to each other in the circumferential direction C1 or C2. Based on such experiment results, a boundary Lp between an area where stress is relatively concentrated and an area where stress is not relatively concentrated is shown in FIG. 6. In other words, in the wheel hub, a relatively high stress is applied to portions in the radially inward direction IR with reference to the boundary Lp, and a relatively low stress is applied to portions in the radially outward direction OR with reference to the boundary Lp.

In an embodiment of the present disclosure, the radially outer boundary of the flange portion 120 of the inner hub part 100 formed of the first material is formed according to the shape of the boundary Lp in FIG. 6, and the remaining portions are filled with the outer hub part 200 formed of the second material. This makes it possible to downsize the wheel hub 10 and replace a part essential for the strength of the wheel hub 10 with the inner hub part 100, which significantly enhances structural efficiency.

Figure 7:
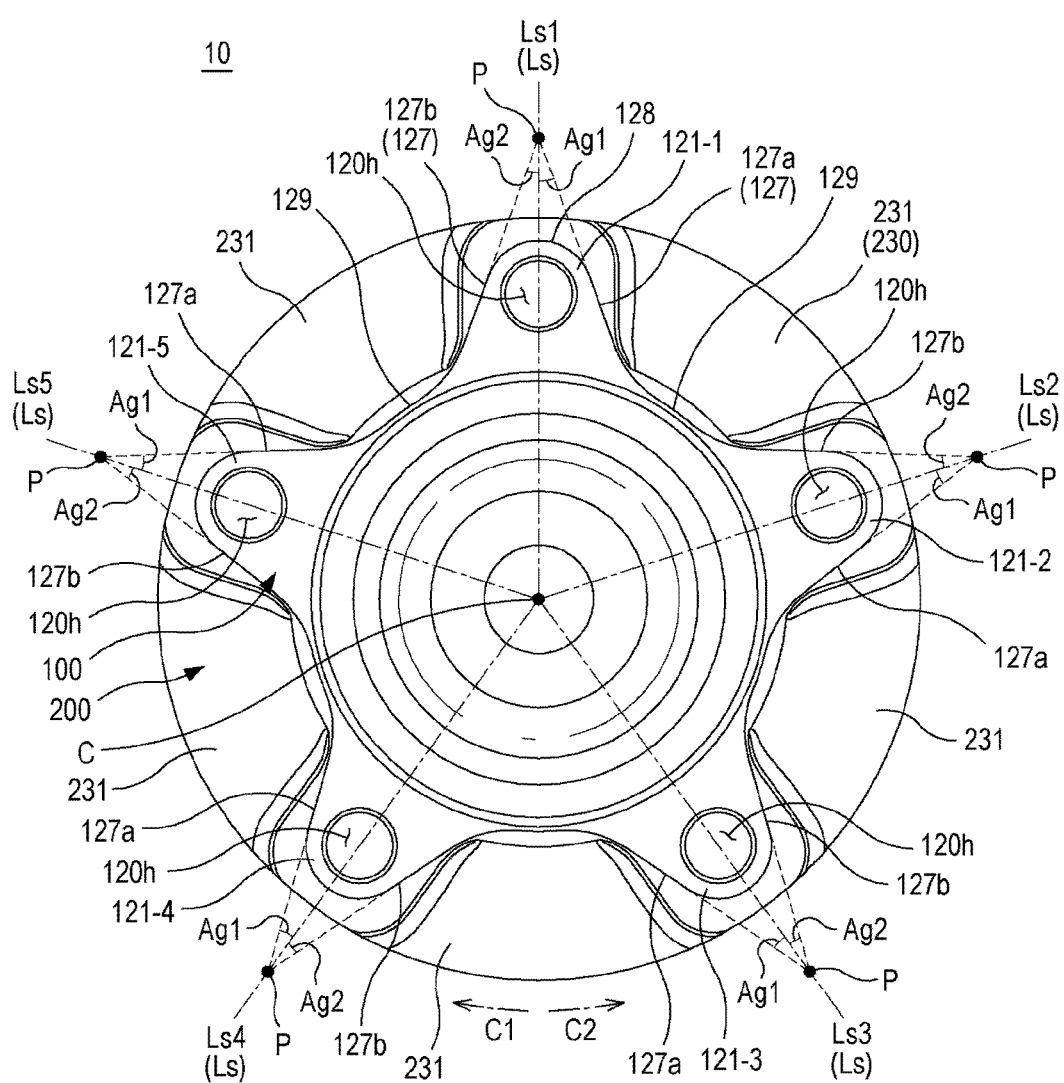
FIG. 7 is an elevation view of the wheel hub 10 of FIG. 2 when viewed from an axially inward direction IA.

FIG. 7 is an elevation view of the wheel hub 10 of FIG. 2 when viewed from an axially inward direction IA. With reference to FIG. 7, a boundary shape of the inner hub part 100 in the radially outward direction OR according to the experimental results illustrated in FIG. 6 will be described in detail.

The boundary shape of the inner hub part 100 will be described by defining a plurality of virtual extension reference lines Ls extending in the radially outward direction OR from the rotational axis C toward the position of each of the plurality of fastening holes 120h. Here, the plurality of virtual extension reference lines Ls are virtual straight lines, but do not refer to actual components. The plurality of virtual extension reference lines Ls correspond to the plurality of fastening holes 120h in a one-to-one basis. Each virtual extension reference line Ls passes the center of the corresponding fastening hole 120h from the rotational axis C and extends in the radially outward direction OR.

The plurality of main extended portions 121 of the inner hub part 100 extend and protrude in the radially outward direction OR along the plurality of virtual extension reference lines Ls. The plurality of main extended portions 121 correspond to the plurality of virtual extension reference lines Ls in a one-to-one basis. In the embodiment illustrated in FIG. 7, five virtual extension reference lines Ls1, Ls2, Ls3, Ls4 and Ls5 corresponding to five fastening holes 120h are shown, and five main extended portions 121-1, 121-2, 121-3, 121-4 and 121-5 corresponding to the five virtual extension reference lines Ls1, Ls2, Ls3, Ls4 and Ls5 are shown.

Each main extended portion 121 forms a boundary 127 at both sides in the circumferential direction with reference to the corresponding extension reference line Ls. In each main extended portion 121, the boundary 127 has a first circumferential boundary 127a and a second circumferential boundary 127b with reference to the corresponding extension reference line Ls.

The first circumferential boundary 127a extends between the radially inward direction IR and the first circumferential direction C1, and the second circumferential boundary 127b extends between the radially inward direction IR and the second circumferential direction C2. The first circumferential boundary 127a may extend linearly between the radially inward direction IR and the first circumferential direction C1. The second circumferential boundary 127b may extend linearly between the radially inward direction IR and the second circumferential direction C2.

A radially outer end of the first circumferential boundary 127a is connected to a radially outer boundary 128 of the main extended portion 121. A radially outer end of the second circumferential boundary 127b is connected to the radially outer boundary 128 of the main extended portion 121. The radially outer boundary 128 of the main extended portion 121 may have a convexly rounded shape in the radially outward direction OR.

A radially inner end of the first circumferential boundary 127a is connected to a radially outer boundary 129 of the auxiliary extended portion 122. A radially inner end of the second circumferential boundary 127b is connected to the radially outer boundary 129 of the auxiliary extended portion 122. The radially outer boundary 129 of the auxiliary extended portion 122 may have a concavely rounded shape in the radially inward direction IR.

The first circumferential boundary 127a of each main extended portion 121 extends in a direction closer to the vertical direction against the virtual extension reference line Ls adjacent to the first circumferential direction C1 than the extension direction of the virtual extension reference line Ls adjacent to the second circumferential direction C2. For example, as illustrated in FIG. 7, the first circumferential boundary 127a of the main extended portion 121-1 extends in a direction closer to the vertical direction against the virtual extension reference line Ls2 adjacent to the first circumferential direction C1 than the extension direction of the virtual extension reference line Ls1 adjacent to the second circumferential direction C2. That is, an angle between the first circumferential boundary 127a of the main extended portion 121-1 and a virtual line perpendicular to the virtual extension reference line Ls2 is smaller than that between the first circumferential boundary 127a of the main extended portion 121-1 and the virtual extension reference line Ls1.

The second circumferential boundary 127b of each main extended portion 121 extends in a direction closer to the vertical direction against the virtual extension reference line Ls adjacent to the second circumferential direction C2 than the extension direction of the virtual extension reference line Ls adjacent to the first circumferential direction C1. For example, as illustrated in FIG. 7, the second circumferential boundary 127b of the main extended portion 121-1 extends in a direction closer to the vertical direction of the virtual extension reference line Ls5 adjacent to the second circumferential direction C2 than the extension direction of the virtual extension reference line Ls1 adjacent to the first circumferential direction C1. That is, an angle between the second circumferential boundary 127b of the main extended portion 121-1 and a virtual line perpendicular to the virtual extension reference line Ls5 is smaller than that between the second circumferential boundary 127b of the main extended portion 121-1 and the virtual extension reference line Ls1.

In each main extended portion 121, the first circumferential boundary 127a defines a first angle Ag1 with respect to the virtual extension reference line Ls adjacent to the second circumferential direction C2, and the second circumferential boundary 127b defines a second angle Ag2 with respect to the virtual extension reference line Ls adjacent to the first circumferential direction C1. For example, as illustrated in FIG. 7, the first circumferential boundary 127a of the main extended portion 121-1 defines the first angle Ag1 with respect to the virtual extension reference line Ls1 adjacent to the second circumferential direction C2, and the second circumferential boundary 127b of the main extended portion 121-1 defines the second angle Ag2 with respect to the virtual extension reference line Ls1 adjacent to the first circumferential direction C1.

The first angle Ag1 and the second angle Ag2 may be the same. The first angle Ag1 may be in a range of 10 to 60 degrees. The second angle Ag2 may be in a range of 10 to 60 degrees.

In each main extended portion 121, the virtual extension line extending along the first circumferential boundary 127a and the virtual extension line extending along the second circumferential boundary 127b may intersect with each other outside the wheel hub 10 in the radially outward direction OR. When viewed from the axially inward direction side, in each main extended portion 121, the virtual extension line of the first circumferential boundary 127a and the virtual extension line of the second circumferential boundary 127b may intersect with each other outside the outer hub part 200 in the radially outward direction OR. In each main extended portion 121, the virtual extension line of the first circumferential boundary 127a and the virtual extension line of the second circumferential boundary 127b may intersect with each other on the corresponding virtual extension reference line Ls. In FIG. 7, an intersection point P of the virtual extension line of the first circumferential boundary 127a with the virtual extension line of the second circumferential boundary 127b is shown.

Figure 8:
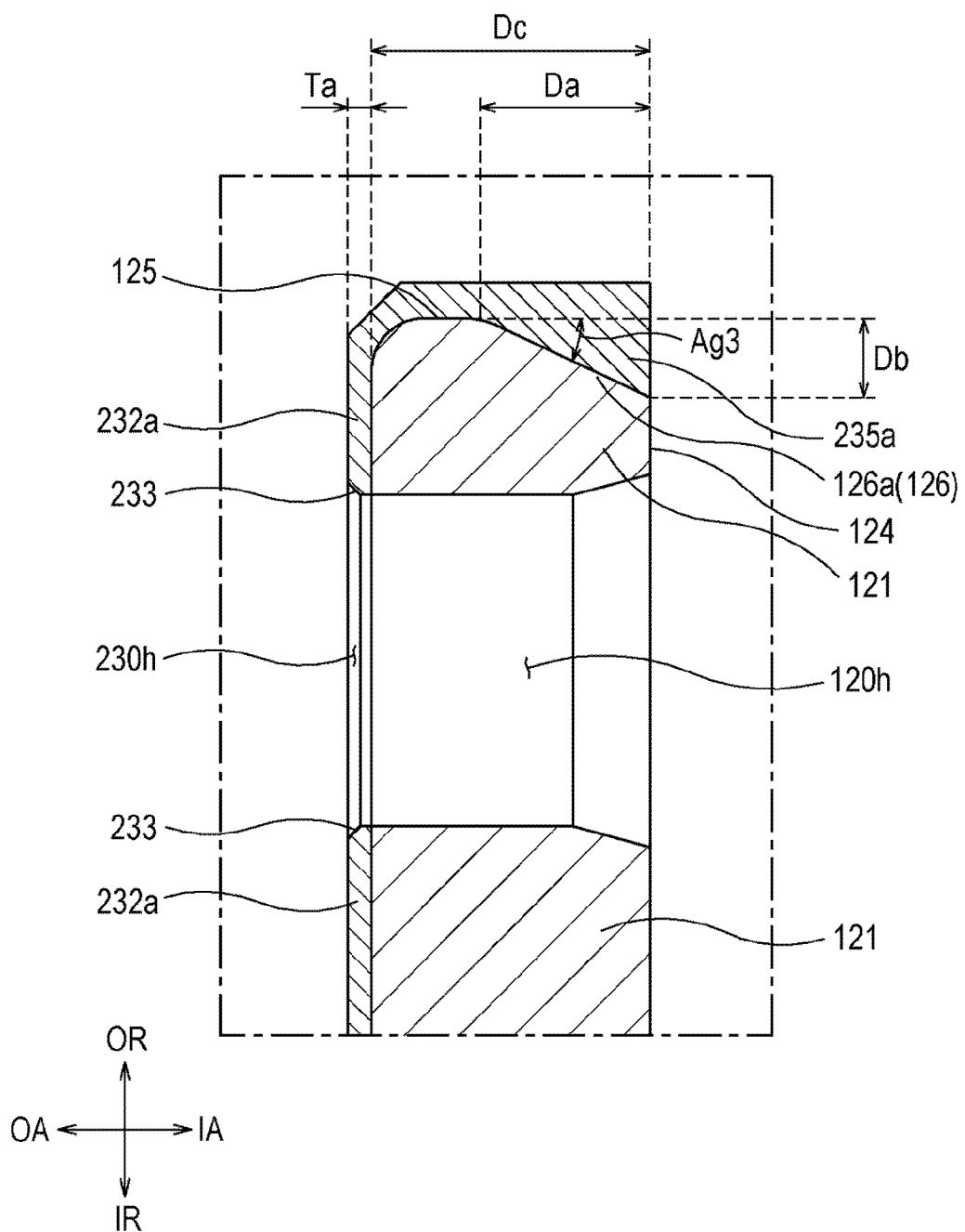
FIG. 8 is a partially enlarged cross-sectional view of a portion E1 in FIG. 5.
Figure 9:
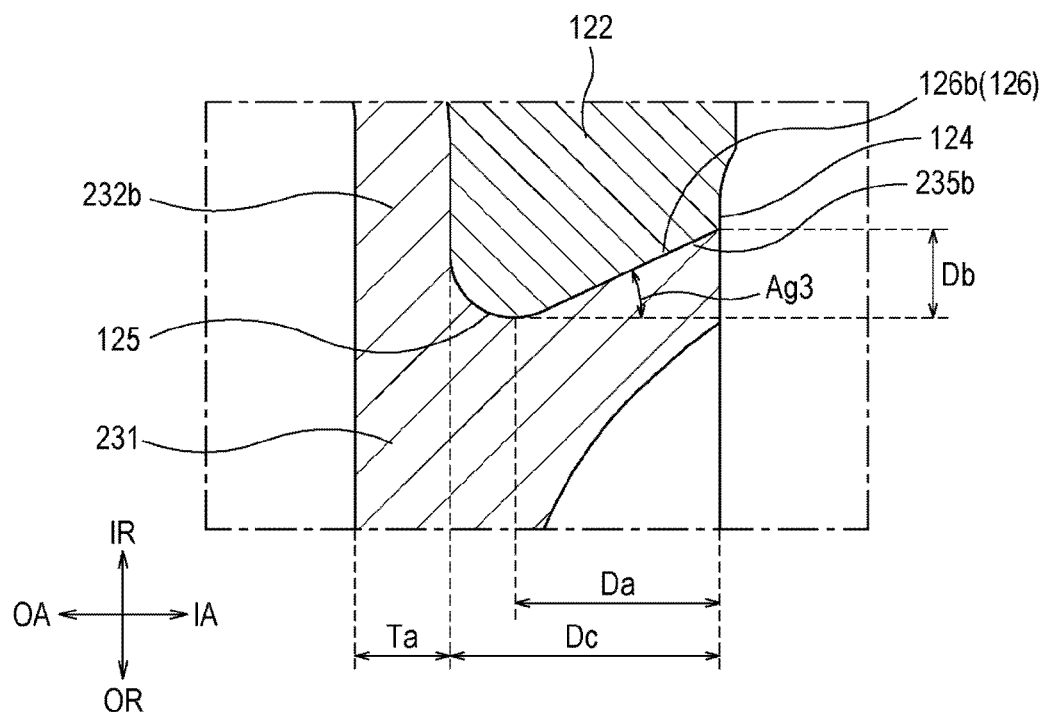
FIG. 9 is a partially enlarged cross-sectional view of a portion E2 in FIG. 5.

FIG. 8 is a partially enlarged cross-sectional view of a portion E1 in FIG. 5. FIG. 9 is a partially enlarged cross-sectional view of a portion E2 in FIG. 5. Referring to FIGS. 8 and 9, a diameter of corresponding holes 230h of the outer hub part 200 may be smallest at an axially inner end portion of corresponding holes 230h. The diameter of the axially inner end portion of the corresponding holes 230h may be equal to or greater than that of an axially outer end portion of the fastening holes 120h of the inner hub part 100. The outer hub part 200 comprises a chamfer portion 233 configured such that the diameter of the corresponding hole 230h gradually increases toward the axially outward direction OA. With this configuration, a portion into which the wheel bolt 61 is press-fitted may be formed by the inner hub part 100 having a relatively high strength. This makes it possible to prevent deformation of the holes 120h and 230h and thus enhance the coupling force between the wheel bolts 61 and the wheel hub 10. In addition, by forming the chamfer portion 233, it is possible to prevent the outer hub part 200 made of the second material having a relatively low strength from being crushed or deformed due to threads of the wheel bolts 61 when press-fitting the wheel bolts 61 into the holes 120h and 230h.

For example, the chamfer portion 233 may be formed by coupling the inner hub part 100 and the outer hub part 200, forming the holes 120h and 320h at the same time with a hole forming apparatus, and then machining the circumference of the hole 320h. The chamfer portion 233 may be disposed on the outer cover portion 232. A thickness Ta of the outer cover portion 232 in the axial direction OA or IA may be at least 0.1 mm.

Hereinafter, the inner hub part 100 and the outer hub part 200 according to an embodiment of the present disclosure will be described with reference to FIGS. 8 and 9. In an embodiment, the locking portion 126 of the flange portion 120 is located at a portion where a radially outer end surface 125 and an axially inner end surface 124 of the flange portion 120 are connected to each other. An axially outer end portion of the locking portion 126 is connected to the radially outer end surface 125 of the flange portion 120. An axially inner end portion of the locking portion 126 is connected to the axially inner end surface 124 of the flange portion 120.

The locking portion 126 has a surface inclined in a direction between the radially inward direction IR and the axially inward direction IA. An angle Ag3 between the axial direction OA or IA and the inclination direction of the locking portion 126 may be in a range of 1 to 45 degrees. When the angle Ag3 between the axial direction OA or IA and the inclination direction of the locking portion 126 excesses 45 degrees, it may be difficult to manufacture the flange portion 120 of covering the locking portion 126 by the forging process described above. In addition, when the angle Ag3 between the axial direction OA or IA and the inclination direction of the locking portion 126 is less than 1 degrees, the axial coupling force between the inner hub part 100 and the outer hub part 200 may be weakened. In an embodiment, the angle Ag3 between the axial direction OA or IA and the inclination direction of the locking portion 126 may be about 25 degrees.

An axial length Da of the locking portion 126 may be equal to or greater than a radial length Db of the locking portion 126. In an embodiment, the axial length Da is greater than the radial length Db.

The axial length Da of the locking portion 126 may be equal to or greater than ⅓ of an axial width Dc of the flange portion 120. In an embodiment, the axial length Da is greater than ½ of the axial width Dc.

The above descriptions on the locking portion 126 with reference to FIGS. 8 and 9 may be applied in both the first locking portion 126*a* in FIG. 8 and the second locking portion 126*b* in FIG. 9.

Figure 10:
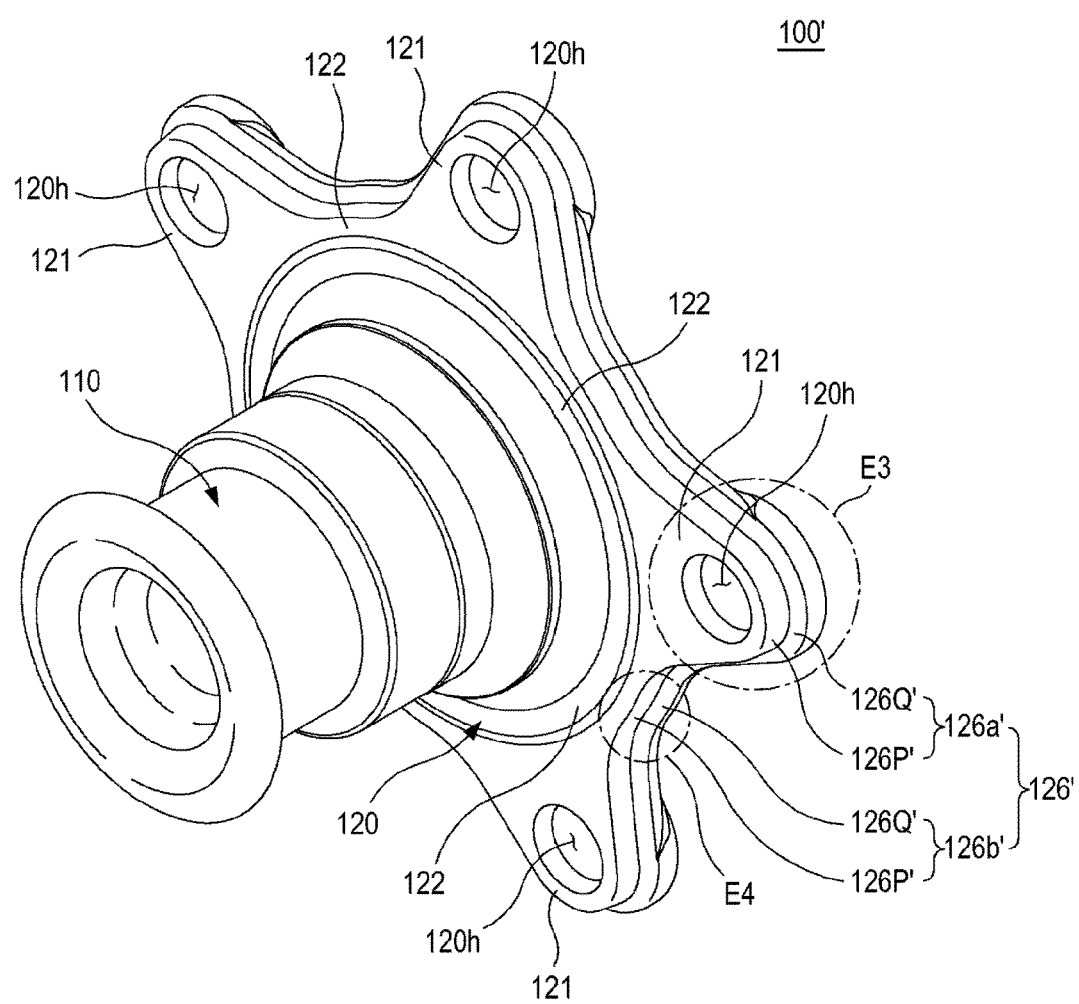
FIG. 10 is a perspective view of an inner hub part 100' according to another embodiment of the present disclosure.
Figure 11:
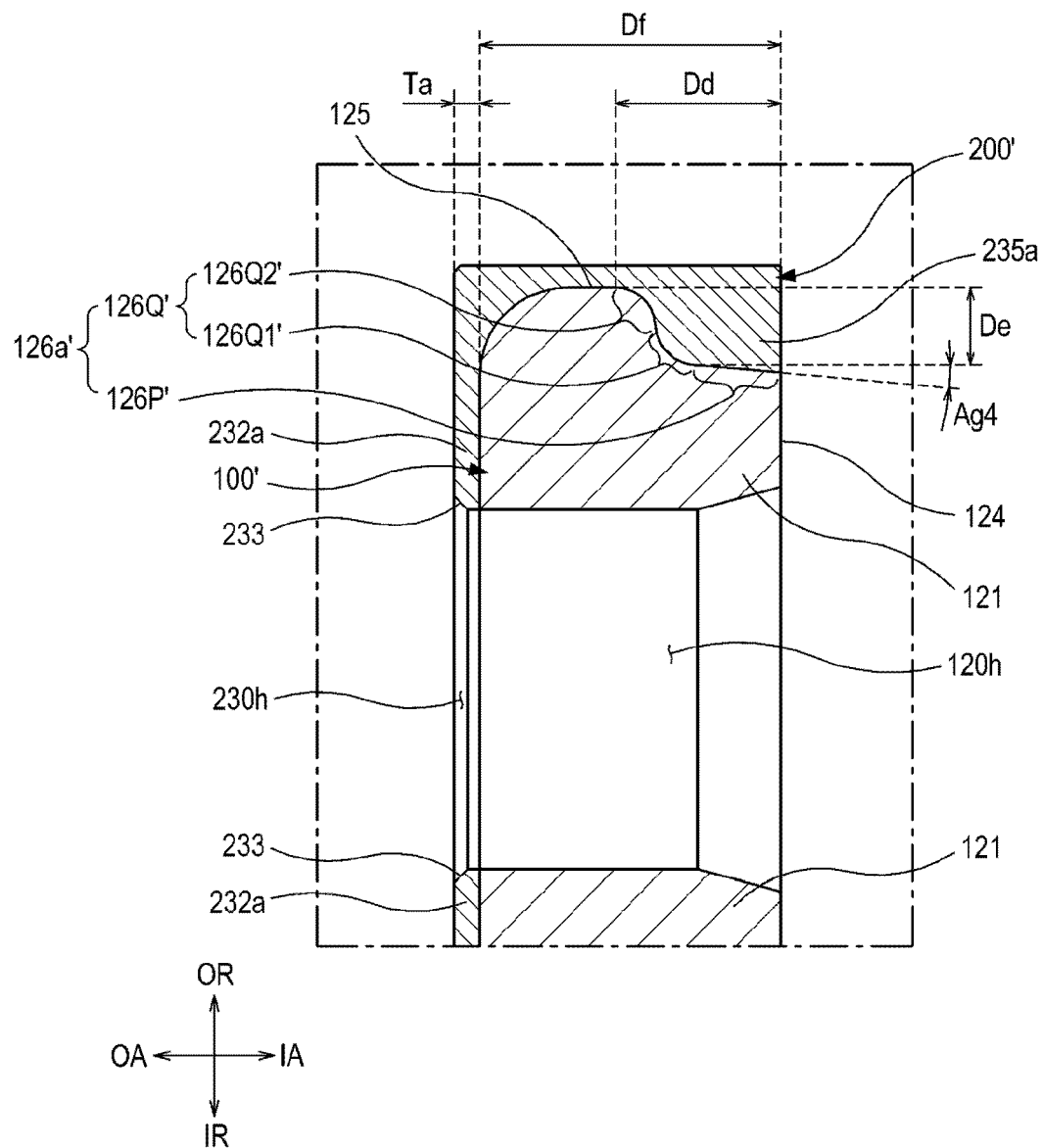
FIG. 11 is a partially cutaway cross-sectional view of a portion E3 in FIG. 10 in a state in which the inner hub part 100' of FIG. 10 is coupled to an outer hub part 200'.
Figure 12:
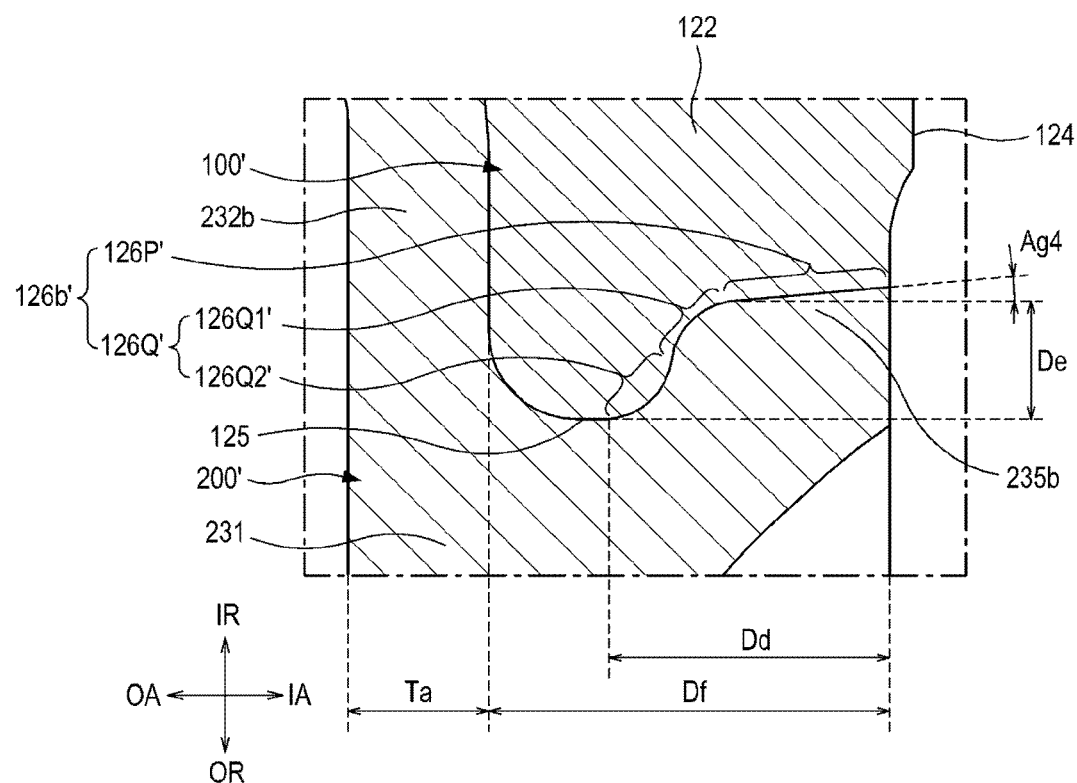
FIG. 12 is a partially cutaway cross-sectional view of a portion E4 in FIG. 10 in a state in which the inner hub part 100' of FIG. 10 is coupled to the outer hub part 200'.

FIG. 10 is a perspective view of an inner hub part 100' according to another embodiment of the present disclosure. FIG. 11 is a partially cutaway cross-sectional view of a portion E3 in FIG. 10 in a state in which the inner hub part 100' of FIG. 10 is coupled to an outer hub part 200'. FIG. 12 is a partially cutaway cross-sectional view of a portion E4 in FIG. 10 in a state in which the inner hub part 100' of FIG. 10 is coupled to the outer hub part 200'. Hereinafter, the inner hub part 100' and the outer hub part 200' according to another embodiment will be described with reference to FIGS. 10 to 12 with a focus on the differences from the inner hub part 100 and the outer hub part 200 according to the above embodiment of the present disclosure.

Referring to FIGS. 10 to 12, in another embodiment, a locking portion 126' of the flange portion 120 has a stepped shape at a portion where the radially outer end surface 125 and the axially inner end surface 124 are connected to each other. The locking portion 126' forms a stepped structure in the radially inward direction IR with respect to the radially outer end surface 125 of the flange portion 120. The locking portion 126' forms a stepped structure in the radially outward direction OR with respect to the axially inner end surface 124 of the flange portion 120. By the shape of the locking portion 126' having the stepped portion, a physical coupling force between the inner hub part 100 and the outer hub part 200' in the axial direction OA or IA can be further increased.

The locking portion 126' of the flange portion 120 of the inner hub part 100' has a first stepped surface 126P' that is spaced apart from the radially outer end surface 125 of the flange portion 120 in the radially inward direction IR. The first stepped surface 126P' is connected to the axially inner end surface 124 of the flange portion 120. An axially inner end portion of the first stepped surface 126P' is connected to the axially inner end surface 124.

The locking portion 126' has a second stepped surface 126Q' that is spaced apart from the axially inner end surface 124 of the flange portion 120 in the axially outward direction OA. The second stepped surface 126Q' is connected to the radially outer end surface 125 of the flange portion 120 and the first stepped surface 126P'. A radially inner end portion of the second stepped surface 126Q' is connected to an axially outer end portion of the first stepped surface 126P'. A radially outer end of the second stepped surface 126Q' is connected to the radially outer end surface 125.

The first stepped surface 126P' has an inclined surface inclined in a direction between the radially inward direction IR and the axially inward direction IA. An angle Ag4 between the axial direction OA or IA and the inclined surface of the first stepped surface 126P' may be in a range of 1 to 45 degrees.

The second stepped surface 126Q' may have a concave curved surface 126Q1' extending in a rounded shape in the radially outward direction OR from the axially outer end portion of the first stepped surface 126P'. The radius of curvature of the concave curved surface 126Q1' may be greater than 0.5 mm.

The second stepped surface 126Q' may have a convex curved surface 126Q2' extending in a rounded shape in the radially inward direction IR from a radially inner end portion of the radially outer end surface 125. The radius of curvature of the convex curved surface 126Q2' may be 0.5 mm or more. In this embodiment, a radially outer end portion of the concave curved surface 126Q 1' is connected to a radially inner end portion of the convex curved surface 126Q2'.

An axial length Dd of the locking portion 126' may be equal to or greater than a radial length De of the locking portion 126'. In an embodiment, the axial length Dd is greater than the radial length De.

The axial length Dd of the locking portion 126' may be equal to or greater than ⅓ of an axial width Df of the flange portion 120. In an embodiment, the axial length Dd is greater than ½ of the axial width Df.

The above descriptions on the locking portion 126' with reference to FIGS. 11 and 12 may be applied in both the first locking portion 126*a*' in FIG. 11 and the second locking portion 126*b*' in FIG. 12.

In addition, the outer hub part 200' covers the radially outer portion of the axially outer surface of the flange portion 120. The outer hub part 200' covers the first stepped surface 126P' and the second stepped surface 126Q'.

Figure 13:
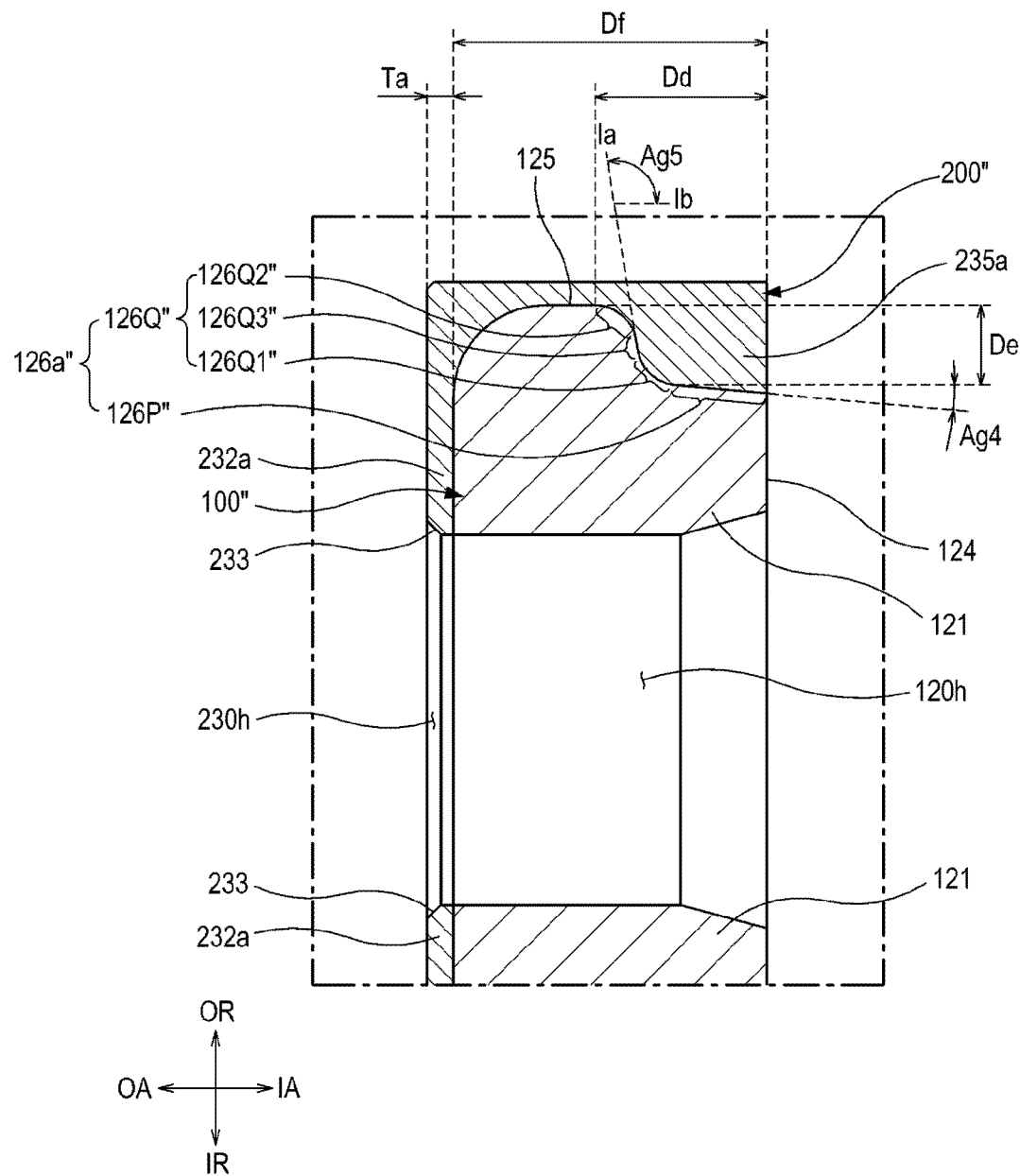
FIG. 13 is a partially cross-sectional view of the inner hub part 100" and the outer hub part 200" in FIG. 11 according to still another embodiment of the present disclosure.
Figure 14:
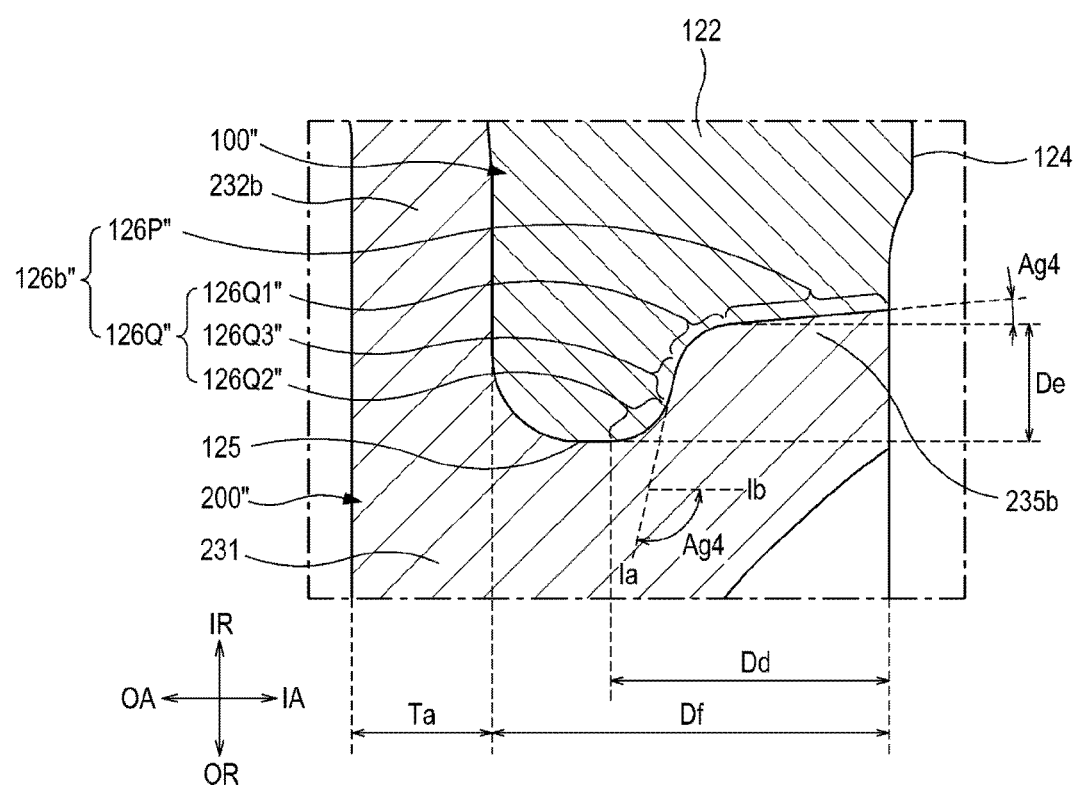
FIG. 14 is a partially cross-sectional view of the inner hub part 100" and the outer hub part 200" in FIG. 12 according to still another embodiment of the present disclosure.

FIG. 13 is a partially cross-sectional view of an inner hub part 100" and an outer hub part 200" according to yet another embodiment of the present disclosure, which is a modification of FIG. 11. FIG. 14 is a partially cross-sectional view of an inner hub part 100" and an outer hub part 200" according to another embodiment of the present disclosure, which is a modification of FIG. 12. Hereinafter, the inner hub part 100" and the outer hub part 200" according to another embodiment of the present disclosure will be described with reference to FIGS. 13 and 14 with a focus on the differences from the inner hub part 100' and the outer hub part 200' according to the above embodiment.

Referring to FIGS. 13 and 14, in another embodiment, a second stepped surface 126Q" of the locking portion 126" of the flange portion 120 has a flat surface 126Q3". The second stepped surface 126Q" may have a concave curved surface 126Q1" and a convex curved surface 126Q2". The flat surface 126Q3" may extend between the concave curved surface 126Q1" and the convex curved surface 126Q2" to connect them. On the other hand, the descriptions on the first stepped surface 126P", the concave curved surface 126Q1", and the convex curved surface 126Q2" are the same as those on the locking portion 126 according to the above embodiment and therefore will be omitted.

The flat surface 126Q3" of the second stepped surfaces 126Q" of the locking portions 126" may extend parallel to the radially outward direction OR, or may extend obliquely while making an acute angle with the radially outward direction OR. The flat surface 126Q3" may extend parallel to the radially outward direction OR, or may extend between the radially outward direction OR and the axially outward direction OA. An angle Ag5 between the axial direction OA or IA and the flat surface 126Q3" may be in a range of 90 to 100 degrees. In FIG. 13, the angle Ag5 between a virtual straight line 1b parallel to the axial direction OA or IA and a virtual straight line 1a parallel to an extension direction of the flat surface 126Q3" is shown.

The descriptions on the locking portion 126" described with reference to FIGS. 13 and 14 may be applied in the first locking portion 126a" in FIG. 13 and the second locking portion 126b" in FIG. 14.

In addition, the outer hub part 200' covers the radially outer portion of the axially outer surface of the flange portion 120. The outer hub part 200" covers the first stepped surface 126P" and the second stepped surface 126Q".

Figure 15:
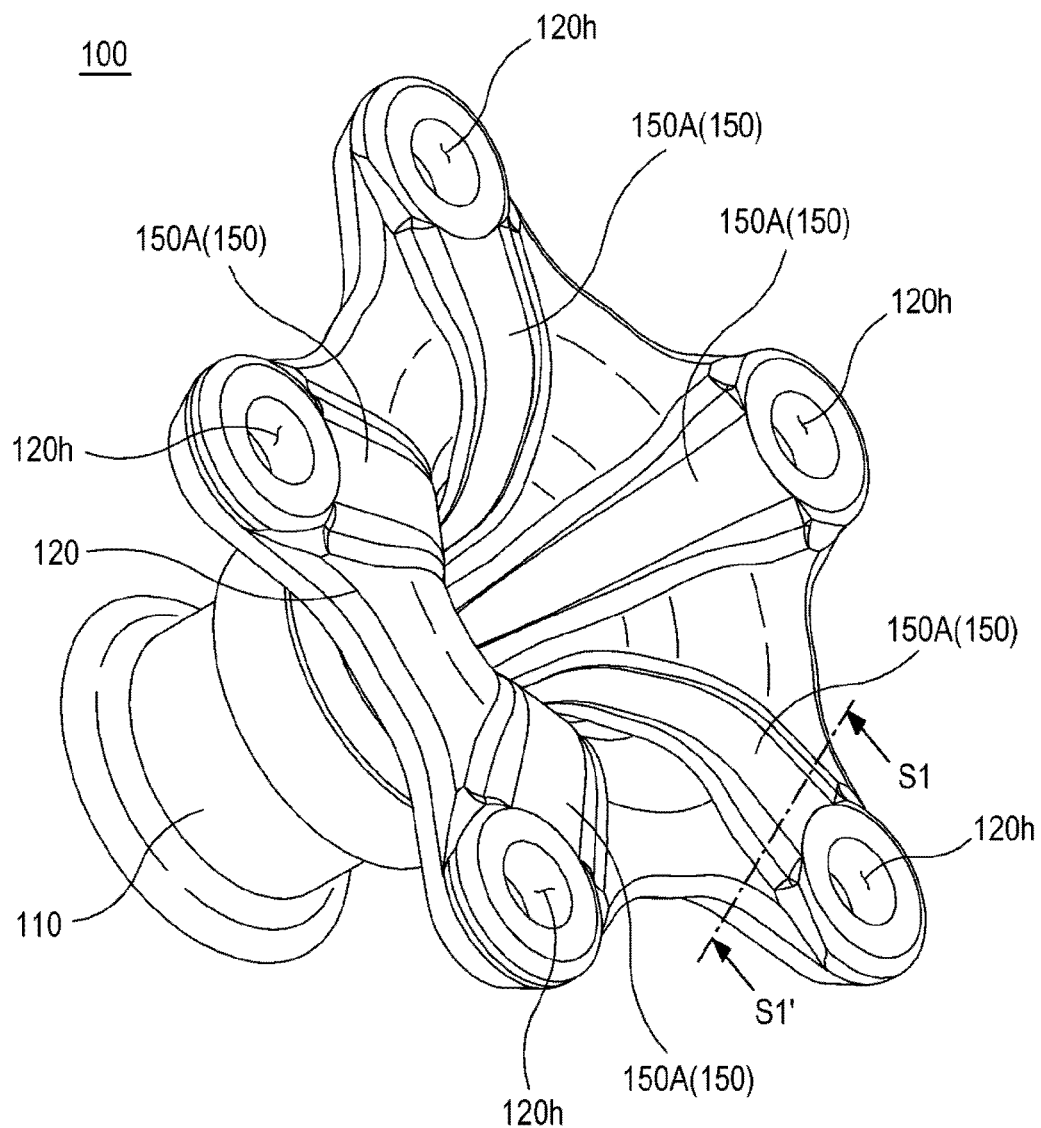
FIG. 15 is a perspective view of the inner hub part 100 of FIG. 2, which illustrates to show an axially outward direction surface, wherein stiffness reinforcement portions 150 according to an embodiment are shown.
Figure 16:
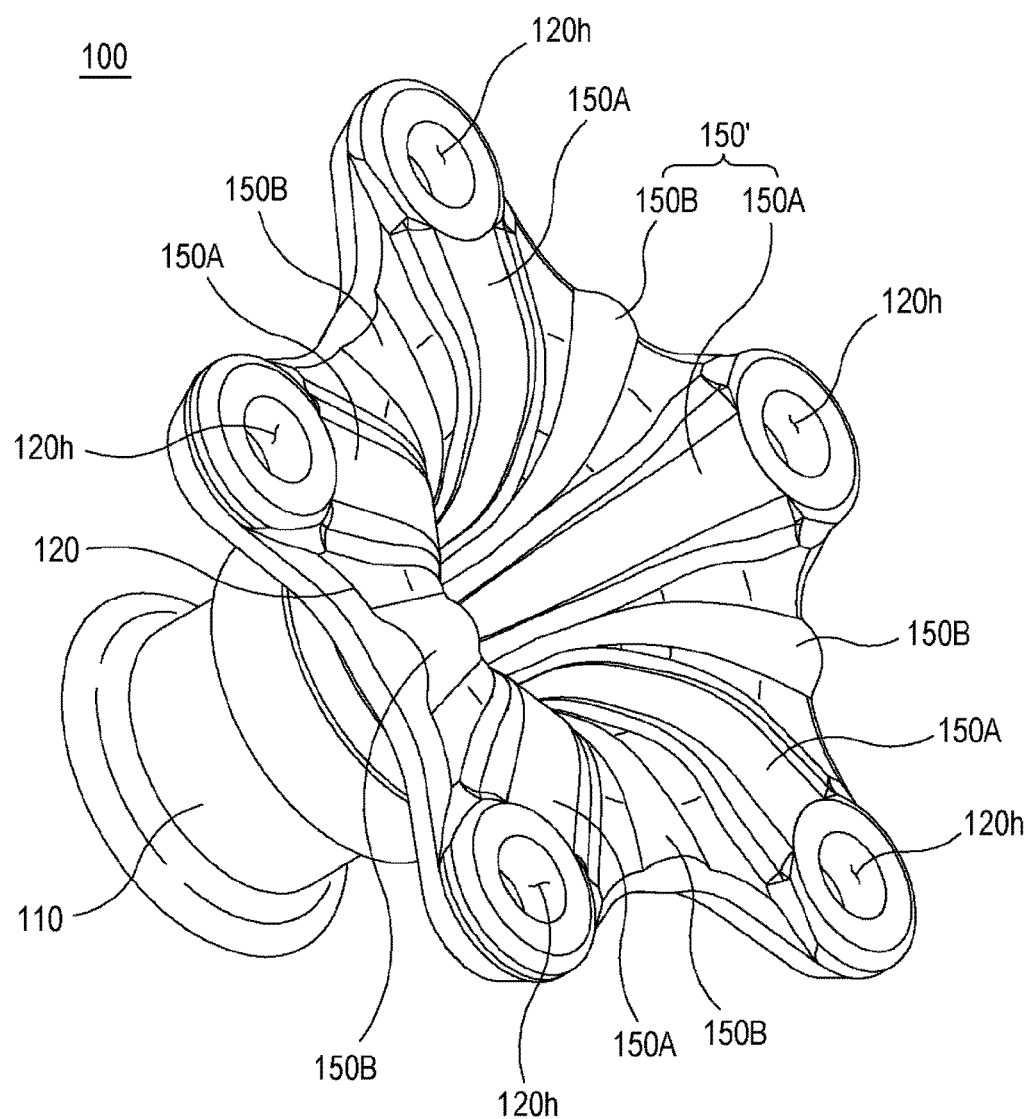
FIG. 16 is a perspective view of the inner hub part 100 of FIG. 2, which illustrates to show an axially outward direction surface, wherein stiffness reinforcement portions 150' according to another embodiment are shown.

FIG. 15 is a perspective view of the inner hub part 100 of FIG. 2, which illustrates to show an axially outward direction surface, wherein stiffness reinforcement portions 150 according to an embodiment are shown. FIG. 16 is a perspective view of the inner hub part 100 of FIG. 2, which illustrates to show an axially outward direction surface, wherein stiffness reinforcement portions 150' according to another embodiment are shown. The stiffness reinforcement portions 150 and 150' will be described with reference to FIGS. 15 and 16.

The inner hub part 100 comprises the plurality of stiffness reinforcement portions 150 and 150' that protrude in the axially outward direction OA and extend in the radial direction OR or IR. The plurality of stiffness reinforcement portions 150 and 150' protrude from the axially outer surface of the inner hub part 100. The plurality of stiffness reinforcement portions 150 and 150' may be arranged at regular intervals in the circumferential direction C1 or C2.

The number of plurality of stiffness reinforcement portions 150 and 150' may be the same as that of plurality of main extended portions 121, or may be a multiple of the number of plurality of main extended portions 121. The expression "multiple of the number" referred to herein means a value obtained by multiplying the number by two or more natural numbers. As a result, the center of gravity of the wheel hub 10 can be prevented from being biased to one side around the rotational axis C.

The plurality of stiffness reinforcement portions 150 and 150' comprise a plurality of first stiffness reinforcement portions 150A that extend in the radially inward direction IR from positions of the plurality of fastening holes. The first stiffness reinforcement portion 150A may have a shape in which a width in the circumferential direction C1 or C2 decreases toward the axially inward direction IA.

The plurality of first stiffness reinforcement portions 150A correspond to the plurality of main extended portions 121. The plurality of first stiffness reinforcement portions 150A correspond to the plurality of virtual extension reference lines Ls described above. Each of the plurality of first stiffness reinforcement portions 150A extends along the corresponding main extended portion 121.

On the other hand, an axially inner surface of the outer hub part 200 is formed in a shape that is engaged with the shape of the axially outer surface of the inner hub part 100. The axially inner surface of the outer hub part 200 surrounds the surfaces of the plurality of stiffness reinforcement portions 150 and 150' of the inner hub part 100.

Referring to FIG. 15, the number of the plurality of stiffness reinforcement portions 150 according to an embodiment is the same as the number of the plurality of main extended portions 121. The plurality of stiffness reinforcement portions 150 comprise the first stiffness reinforcement portions 150 but do not comprise a second stiffness reinforcement portions 150B which will be described later.

Referring to FIG. 16, the number of the plurality of stiffness reinforcement portions 150' according to another embodiment is the same as a multiple of the number of the plurality of main extended portions 121. In the present embodiment, the number of the plurality of stiffness reinforcement portions 150' is two times the number of the plurality of main extended portions 121.

The plurality of stiffness reinforcement portions 150' comprise a plurality of first stiffness reinforcement portions 150A. The plurality of stiffness reinforcement portions 150' further comprise a plurality of second stiffness reinforcement portions 150B disposed between the plurality of first stiffness reinforcement portions 150A. The second stiffness reinforcement portions 150B extend in the radial direction OR or IR over the axially outer surface of the auxiliary extended portion 122. The second stiffness reinforcement portions 150B may be formed in a shape in which a width in the circumferential direction C1 or C2 decreases toward the axially inward direction IA. A length of the second stiffness reinforcement portion 150B in the radial direction OR or IR is shorter than that of the first stiffness reinforcement portion 150A in the radial direction OR or IR.

Figure 17:
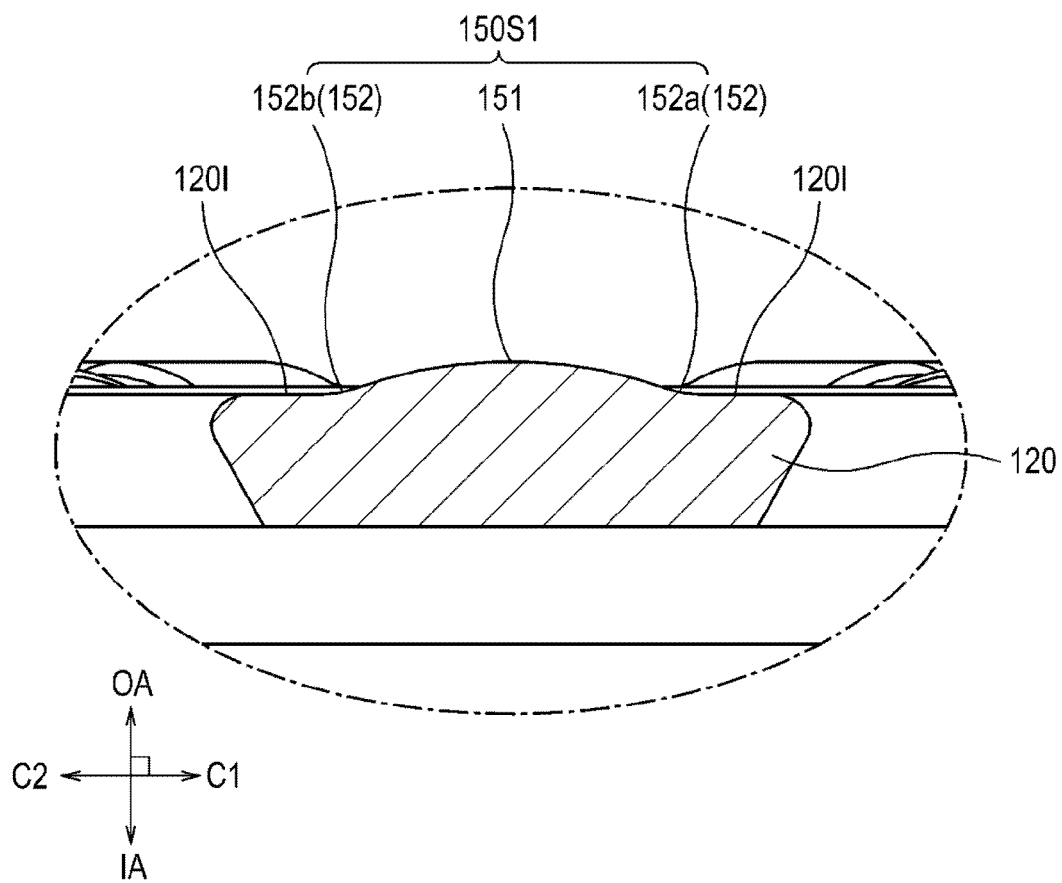
FIG. 17 is a cross-sectional view of the inner hub part 100 which is taken along line S1-S1' in FIG. 15, wherein a stiffness reinforcement portion 150S1 according to a first embodiment is shown.
Figure 18:
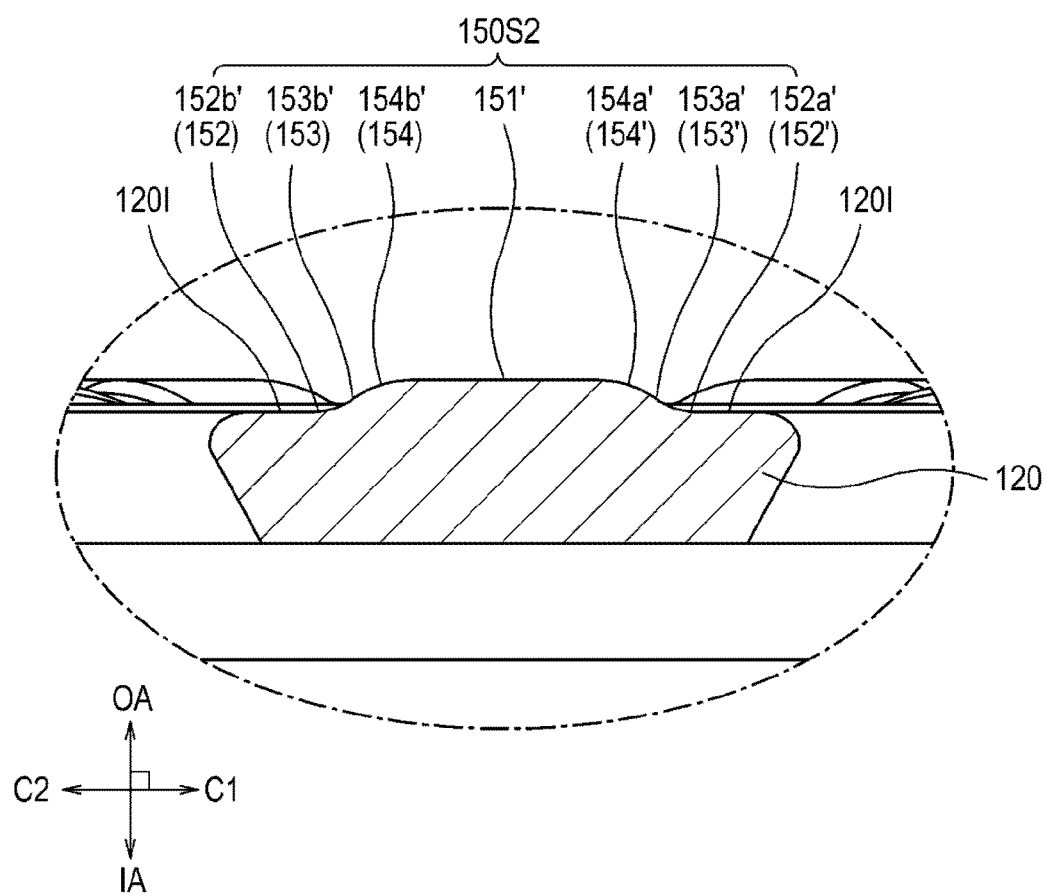
FIG. 18 is a cross-sectional view of the inner hub part 100 which is taken along line S1-S1' in FIG. 15, wherein a stiffness reinforcement portion 150S2 according to a second embodiment is shown.

FIG. 17 is a cross-sectional view of the inner hub part 100 which is taken along line S1-S1' in FIG. 15, wherein a stiffness reinforcement portion 150S1 according to a first embodiment is shown. FIG. 18 is a cross-sectional view of the inner hub part 100 which is taken along line S1-S1' in FIG. 15, wherein a stiffness reinforcement portion 150S2 according to a second embodiment is shown. Cross-sectional shapes of the stiffness reinforcement portions 150S1 and 150S2 will now be described with reference to FIGS. 17 and 18.

As illustrated in FIGS. 17 and 18, central portions 151 and 151' of surfaces of the stiffness reinforcement portions 150S1 and 150S2 in the circumferential direction C1 or C2 are flat in a direction perpendicular to the axially outward direction OA, or protrude roundly in the axially outward direction OA. The stiffness reinforcement portions 150S 1 and 150S2 comprise top portions 151 and 151' that form the central portions of the surfaces in the circumferential direction C1 or C2.

An end of the surface of each of the stiffness reinforcement portions 150S1 and 150S2 in the circumferential direction C1 or C2 is connected roundly to a surface 1201 of another portion of the inner hub part 100. The stiffness reinforcement portions 150S1 and 150S2 comprises base portions 152 and 152' that form the ends of the surfaces in the circumferential direction C1 or C2. The base portions 152 and 152' are formed to have rounded concave surfaces.

Referring to FIG. 17, the top portion 151 of the stiffness reinforcement portion 150S1 according to the first embodiment forms a rounded surface protruding in the axially outward direction OA. An end of the top portion 151 in in the first circumferential direction C1 is connected to a first base portion 152a, and an end of the top portion 151 in the second circumferential direction C2 is connected to a second base portion 152b.

Referring to FIG. 18, the top portion 151' of the stiffness reinforcement portion 150S2 according to the second embodiment forms a flat surface perpendicular to the axially outward direction OA. The stiffness reinforcement portion 150S2 further comprises a top connection portion 154' connected to both ends of the top portion 151' in the circumferential direction C1 and C2. The top connecting portion 154' forms a roundly protruded surface. The end of the top portion 151' in the first circumferential direction C1 is connected to a first top connection portion 154a', and the end of the top portion 151' is connected to a second top connection portion 154b' in the second circumferential direction C2.

The stiffness reinforcement portion 150S2 further comprises a side connection portion 153' that connects the base portions 152a' and 152b' and the top connection portion 154'. A first side connection portion 153a' extends between the first base portion 152a' and the first top connection portion 154a' to connect them. A second side connection portion 153b' extends between the second base portion 152b' and the second top connection portion 154b' to connect them.

Although the technical spirit of the present disclosure has been described using some embodiments and examples shown in the accompanying drawings, it should be noted that various substitutions, modification, and variations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A wheel hub, comprising:
an inner hub part made of a first material and comprising a central portion formed to protrude in an axially inward direction and a flange portion formed to extend in a radially outward direction from the central portion; and
an outer hub part made of a second material, which is lower in strength and lighter in weight than the first material, and configured to be integrally coupled with the inner hub part,
wherein the flange portion comprises a plurality of main extended portions in which a plurality of fastening holes are formed to penetrate in an axial direction while being arranged to be spaced apart from each other along a circumferential direction so that a wheel is mounted to the flange portion, the plurality of main extended portions being formed to extend along a plurality of virtual extension reference lines which respectively extend in the radially outward direction from a rotational axis toward positions of the plurality of fastening holes,
wherein the outer hub part comprises a circumferential portion extending in the circumferential direction to connect the plurality of main extended portions,
wherein each of the plurality of main extended portions has a first circumferential boundary and a second circumferential boundary with reference to the corresponding extension reference line,
wherein the first circumferential boundary extends in a direction between a radially inward direction and a first circumferential direction, and the second circumferential boundary extends in a direction between the radially inward direction and a second circumferential direction,
wherein the first circumferential boundary of each of the plurality of main extended portions extends in a direction closer to a vertical direction against the virtual extension reference line positioned adjacent to the first circumferential direction than an extension direction of the virtual extension reference line positioned adjacent to the second circumferential direction, and the second circumferential boundary of each of the plurality of main extended portions extends in a direction closer to a vertical direction against the virtual extension reference line positioned adjacent to the second circumferential direction than an extension direction of the virtual extension reference line positioned adjacent to the first circumferential direction,
wherein the flange portion comprises a locking portion positioned at a portion where a radially outer end surface and an axially inner end surface of the flange portion are connected, and an axially inner end portion of the flange portion is more concave in the radially inward direction than an axially outer end portion of the flange portion, and
wherein the outer hub part covers the locking portion and a radially outer portion of an axially outer surface of the flange portion.

2. The wheel hub of claim 1, wherein each of the plurality of fastening holes is formed at a radially outward direction portion of the corresponding main extended portion.

3. The wheel hub of claim 1, wherein in each of the plurality of main extended portions, the first circumferential boundary defines a first angle with respect to the virtual extension reference line positioned adjacent to the second circumferential direction, and the second circumferential boundary defines a second angle with respect to the virtual extension reference line positioned adjacent to the first circumferential direction, and
wherein the first angle and the second angle are identical to each other.

4. The wheel hub of claim 1, wherein in each of the plurality of main extended portions, the first circumferential boundary defines a first angle with respect to the virtual extension reference line positioned adjacent to the second circumferential direction, and the second circumferential boundary defines a second angle with respect to the virtual extension reference line positioned adjacent to the first circumferential direction, and
wherein the first angle is in a range of 10 to 60 degrees, and the second angle is in the range of 10 to 60 degrees.

5. The wheel hub of claim 1, wherein in each of the plurality of main extended portions, a virtual extension line which extends along the first circumferential boundary and a virtual extension line which extends along the second circumferential boundary intersect with each other outside the outer hub part in the radially outward direction.

6. The wheel hub of claim 1, wherein the locking portion comprises a surface inclined in a direction between the radially inward direction and the axially inward direction.

7. The wheel hub of claim 6, wherein an angle between the axial direction and the inclined surface of the locking portion is in a range of 1 to 45 degrees.

8. The wheel hub of claim 6, wherein an axial length of the locking portion is equal to or greater than a radial length of the locking portion.

9. The wheel hub of claim 1, wherein the locking portion comprises a first stepped surface spaced apart in the radially inward direction from a radially outer end surface of the flange portion and connected to an axially inner end surface of the flange portion; and a second stepped surface spaced apart in an axially outward direction from the axially inner end surface and connected to the radially outer end surface and the first stepped surface.

10. The wheel hub of claim 9, wherein the second stepped surface has a concave curved surface formed to extend roundly in the radially outward direction from an axially outer end of the first stepped surface and a convex curved surface formed to extend roundly in the radially inward direction from an axially inner end of the radially outer end surface.

11. The wheel hub of claim 10, wherein the second stepped surface further has a flat surface formed to extend from the concave curved surface to the convex curved surface so as to connect the concave curved surface and the convex curved surface.

12. The wheel hub of claim 9, wherein the first stepped surface has a surface formed to be inclined in a direction between the radially inward direction and the axially inward direction.

13. The wheel hub of claim 1, wherein the outer hub part covers axially outer surfaces of the plurality of main extended portions and comprises a plurality of corresponding holes formed to penetrate the plurality of main extended portions in the axial direction at positions corresponding to the plurality of fastening holes so as to be connected to the plurality of fastening holes, respectively, and wherein a diameter of each of the plurality of corresponding holes is the smallest at an axially inner end portion of the corresponding hole, and a diameter at the axially inner end portion of the corresponding hole is equal to or greater than a diameter of an axially outer end portion of the fastening hole.

14. The wheel hub of claim 1, wherein the inner hub part comprises a plurality of stiffness reinforcement portions formed to protrude in an axially outward direction and extend in a radial direction, wherein the outer hub part covers an axially outer surface of the inner hub part, wherein the plurality of stiffness reinforcement portions comprises a plurality of first stiffness reinforcement portions extending in the radially inward direction from the positions of the plurality of fastening holes, and wherein the number of the plurality of stiffness reinforcement portions is equal to the number of the plurality of main extended portions, or equal to a multiple of the number of the plurality of main extended portions.

15. The wheel hub of claim 14, wherein a circumferential end of a surface of each of the plurality of stiffness reinforcement portions is connected roundly to a surface of another portion of the inner hub part.

16. The wheel hub of claim 15, wherein a circumferential central portion of the surface of each of the plurality of the stiffness reinforcement portions is flat in a direction perpendicular to the axially outward direction, or protrudes roundly in the axially outward direction.

17. The wheel hub of claim 14, wherein the plurality of stiffness reinforcement portions comprise a plurality of second stiffness reinforcement portions provided between the plurality of first stiffness reinforcement portions.

18. The wheel hub of claim 14, wherein the plurality of stiffness reinforcement portions are formed in a shape in which a circumferential width thereof decreases toward the axially inward direction.

19. A wheel bearing assembly, comprising:
an outer ring;
the wheel hub of claim 1, the wheel hub being configured to be rotatable relative to the outer ring and is configured to rotate together with a wheel; and
rolling members provided between the outer ring and the wheel hub.

* * * * *